(12) United States Patent
Yasue et al.

(10) Patent No.: US 6,483,947 B1
(45) Date of Patent: Nov. 19, 2002

(54) VIDEO SIGNAL PROCESSING APPARATUS

(75) Inventors: Ken Yasue, Kyotofu (JP); Katsuhisa Yano, Hyogoken (JP); Takao Kashiro, Osakafu (JP); Hisaji Murata, Osakafu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/270,531

(22) Filed: Mar. 17, 1999

(30) Foreign Application Priority Data

Mar. 17, 1998 (JP) .......................... 10-066580
Mar. 17, 1998 (JP) .......................... 10-066599

(51) Int. Cl.[7] .......................... G06K 9/36; H04B 1/66
(52) U.S. Cl. .................................. 382/246; 375/240.23
(58) Field of Search ................................ 382/239, 236, 382/238, 245, 246, 250, 251; 386/109, 111, 112; 375/240.03, 240.1, 240.12, 240.13, 240.23, 240.2

(56) References Cited

U.S. PATENT DOCUMENTS

| | | | |
|---|---|---|---|
| 5,568,278 A | * 10/1996 | Nakano et al. | 358/427 |
| 5,666,161 A | 9/1997 | Kohiyama et al. | 348/408 |
| 5,684,539 A | 11/1997 | Boyce et al. | 348/420 |
| 5,717,816 A | 2/1998 | Boyce et al. | 386/111 |
| 6,023,553 A | * 2/2000 | Boyce et al. | 386/109 |
| 6,154,494 A | * 11/2000 | Sugahara et al. | 375/240.23 |
| 6,219,381 B1 | * 4/2001 | Sawada et al. | 375/14 |

FOREIGN PATENT DOCUMENTS

| | | |
|---|---|---|
| EP | 0 584 741 | 3/1994 |
| EP | 0 627 858 | 12/1994 |
| EP | 0 711 077 | 5/1996 |
| EP | 0 724 361 | 7/1996 |
| EP | 0 823 822 | 2/1998 |
| JP | 08032929 | 2/1996 |
| JP | 09322165 | 12/1997 |

* cited by examiner

*Primary Examiner*—Jose L. Couso
*Assistant Examiner*—Kanji Patel
(74) *Attorney, Agent, or Firm*—Wenderoth, Lind & Ponack, L.L.P.

(57) ABSTRACT

A video signal processing apparatus processes coded data obtained by compressively coding a digitized video signal. The apparatus includes a specific component removing unit for removing specific components in the coded data. The specific component removing unit has a variable-length decoding unit for subjecting the variable-length coded data to variable-length decoding, an inverse quantization unit for inversely quantizing the processing result of the variable-length decoding unit, by using a first quantization matrix, a quantization unit for quantizing the processing result of the inverse quantization unit, by using a second quantization matrix, and a variable-length coding unit for subjecting the processing result of the quantization unit to variable-length coding. Therefore, the data quantity of the variable-length coded data can be reduced without significantly increasing the circuit scale.

2 Claims, 14 Drawing Sheets

903 data quantity reduction unit

VIDEO SIGNAL PROCESSING APPARATUS

FIELD OF THE INVENTION

The present invention relates to video signal processing apparatuses and, more particularly, to a video signal processing apparatus that reduces the quantity of data which have been digitized and compressively coded.

BACKGROUND OF THE INVENTION

When a video which is an analog signal is digitized to be handled as a digital video signal, it can be handled integrally with digitized audio signal, character data, program and the like and, moreover, data processing such as data compression or encryption is easily carried out.

Image data of a digital video signal or the like is an array of pixels which are discrete digital data having pixel values indicating luminance and chrominance, and it is processed for every frame corresponding to one image. When image data of each frame is compressively coded for recording or transmission, intra-frame coding based on spatial correlation within one frame is performed, and the compression ratio can be increased by performing, as well as intra-frame coding, inter-frame coding based on temporal correlation between frames which are close each other in time series. According to intra-frame coding, I pictures, which can be decoded independently, are obtained. According to inter-frame coding, P pictures are obtained by performing prediction in the forward direction while B pictures are obtained by performing prediction in both of the forward and backward directions. Although the compression ratio of the P or B pictures is increased by processing the difference data, these pictures cannot be decoded independently.

In a general compressive coding technique such as MPEG, discrete cosine transform (DCT) is carried out. DCT is performed on each pixel block comprising a predetermined number of pixels. In the state before DCT, the pixel values are randomly distributed over the pixel block. However, in DCT coefficients obtained as the result of DCT, large pixel values are unevenly distributed in a low frequency band. So, the DCT coefficients are subjected to quantization (i.e., division) to make the values of high-band components 0, and further subjected to variable-length coding based on a series of the same value, thereby obtaining compressed variable-length code ward data. Usually, the variable-length code word data is recorded or transmitted.

When recording such digitized and compressively coded data in a recording medium, a transparent recording method represented by MPEG2-TS is used as well as a base band recording method which has conventionally been used. According to the transparent recording method, data (e.g., variable-length code word data) transmitted as a bit stream is recorded as it is and, therefore, this method has the advantage of needing no encoder or decoder for a digital video signal, and keeping the image quality of the transmitted data as it is.

As an example of a recording medium used for recording and retaining a digital video signal, there is a digital video cassette tape. In "DVB (Digital Video Broadcasting) Signal Recording DVCR (Digital Video Cassette Recorder) Standard" by HD-DVCR conference held at December 1995, a recording format for a digital TV broadcast signal processed in accordance with MPEG is standardized, and this standard includes, as an option, the standard of recording of data for trick play (TP). Hereinafter, a description is given of recording of data for rapid play in this standard.

It is assumed that two kinds of data for rapid play having different search speeds are to be recorded. When recording data on a tape record medium, a signal is recorded on part called tracks. The data for rapid play is repeatedly recorded on plural tracks so that it can be searched at a high speed. Therefore, the maximum search speed is decided according to the number of repetitions of recording. Here, it is assumed that TPH data which can be read at a search speed 18 times as high as the normal speed at the maximum, and TPL data which can be read at a search speed 4 times as high as the normal speed at the maximum, are recorded.

FIG. 14 is a diagram for explaining recording of such data on a tape record medium, illustrating a track pattern of a DVCR in which MPEG2-TS data is allocated on a tape. As shown in FIG. 14, in this track format, a unit comprising four tracks (F0, F1, F0, F2) is repeated. When data for trick play (rapid play) is recorded in this format (since it is an option as mentioned above), the data should be allocated in a specific position in the tape.

Data to be recorded in the tape is based on a sync block of a fixed data quantity, and the data for rapid play is recorded for every five sync blocks in a specific position in a video data recording area shown in FIG. 14. To be specific, TPH data is recorded in positions on the F0 track, which positions are indicated by sync block numbers 40–44, 62–66, 84–88, 106–110, 128–132, and 150–154, that is, it is recorded in 30 sync blocks in total (5 sync blocks×6 positions). Further, TPL data is recorded in a position in the F1 track, which position is indicated by sync block numbers 131–155, that is, it is recorded in 25 sync blocks.

As described above, in this standard, recording of data for trick play is an option, so that sync block extra headers given to the respective sync blocks are used for identification of data recorded in the above-mentioned positions. FIG. 15 shows the state of a sync block extra header given to data for rapid play. The sync block extra header is a 1-byte header included in each sync block, and one bit shown by b7 in the figure is used to distinguish between data for normal-speed play and data for rapid play. In FIG. 15, the value of b7 is 1, and this indicates that the sync block is data for trick play (rapid play).

Amongst the other bits composing the sync block extra header, one bit shown by b6 is a bit used for deciding whether the sync block is new frame data or not, and this is a bit of a frame toggle used as a toggle. It is defined that frame toggling should not be performed more than two times within one track. Bits shown by b2–b5 are used as a counter for distinguishing areas of data for trick play. Further, b0 and b1 are reserved.

As described above, in the DVCR, data for rapid play is recorded in a specific position in accordance with the optional standard, and the effect that the data recorded in that position is data for trick play (rapid play) is identified by the header.

As described above, when handling digital video data, the data is compressively coded by DCT, quantization, and variable-length coding, to be recorded or transmitted. Since variable-length code ward data obtained through these processes includes high-band (high-frequency) components of DCT coefficients, it is possible to reduce the data quantity for recording or transmission by removing the high-band components which have less influence on the quality of reproduced image. However, such reduction of data quantity has hardly been performed.

A thinkable method for reducing the data quantity is as follows. That is, variable-length code word data (digital data) is once analogized, and high-band components are removed from the analog signal and, thereafter, the analog signal is again digitized to obtain variable-length code word data. According to this method, high-band components are appropriately removed from the variable-length code word data to reduce the data quantity. In this method, however, since the reverse processes of digitization and compressive coding to generate the variable-length code word data are performed and then further digitization and compressive coding are performed, the circuit scale and the processing time are increased. Especially the circuit scale and the number of processes for the digital-to-analog conversion are considerable, it is not practical to reduce the data quantity according to this method.

Further, in the case where the digital data so obtained is recorded on a tape record medium or the like by the above-mentioned transparent recording method, when the digital data is recorded as data for trick play such as rapid play, the image quality is significantly degraded at the time of trick play. The reason is as follows. According to the transparent recording method, the above-mentioned I, P, or B picture is recorded as it is. So, if the P or B picture which is not assumed to be decoded independently is used as data for rapid play, loss of data is considerable.

Accordingly, if only I pictures are extracted to be used, available data for rapid play is obtained. However, in the recording format of the tape record medium, since the positions to record the data for trick play are specified as shown in FIG. 14, in order to secure a practical update cycle, it is desirable to reduce the data quantity of the I pictures, without recording every I picture. In this case, to simplify the procedure, one I picture is selected from several I pictures, and this is used as data for rapid play.

However, when the data for rapid play generated as described above is reproduced for display, since the display lacks the information of motion, satisfactory display result is not obtained. Therefore, it is preferable to reduce the data quantity in every I picture so as to obtain data for rapid play which can transmit the information of motion, although such reduction is attended with some degradation in image quality. However, such a method for reducing the data quantity has not been proposed in the video signal processing according to the prior arts.

SUMMARY OF THE INVENTION

It is an object of the present invention to provide a video signal processing apparatus which can reduce the quantity of variable-length code word data without significantly degrading the quality of reproduced image.

It is another object of the present invention to provide a video signal processing apparatus which enables recording of data for rapid play on a tape record medium or the like, with reduced data quantity, without significantly degrading the quality of reproduced image.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a video signal processing apparatus for processing coded data obtained by compressively coding a digitized video signal, includes specific component removing means for removing specific components in the coded data. Therefore, the data quantity of the coded data can be reduced by removing specific components of the coded data, which components have less influence on the quality of the reproduced image.

According to a second aspect of the present invention, in the video signal processing apparatus of the first aspect, the coded data to be processed is obtained by variable-length coding, and the specific component removing means removes, as the specific components, high-band components included in the variable-length coded data. Therefore, the data quantity of the variable-length coded data can be reduced by removing specific components of the variable-length coded data, which components have less influence on the quality of the reproduced image.

According to a third aspect of the present invention, in the video signal processing apparatus of the second aspect, the specific component removing means comprises variable-length decoding means for subjecting the variable-length coded data to variable-length decoding; inverse quantization means for inversely quantizing the processing result of the variable-length decoding means, by using a first quantization matrix; quantization means for quantizing the processing result of the inverse quantization means, by using a second quantization matrix; and variable-length coding means for subjecting the processing result of the quantization means to variable-length coding. Therefore, the data quantity of the variable-length coded data can be reduced by removing specific components of the variable-length coded data, which components have less influence on the quality of the reproduced image, without performing digital to analog conversion which causes an increase in circuit scale, whereby flexible setting is realized in the data removal process.

According to a fourth aspect of the present invention, in the video signal processing apparatus of the second aspect, the specific component removing means comprises variable-length decoding means for subjecting the variable-length coded data to variable-length decoding; decoding result processing means for subjecting the processing result of the variable-length decoding means to a process of changing the value of a specific part constituting the processing result; and variable-length coding means for subjecting the processing result of the decoding result processing means to variable-length coding. Therefore, the data quantity of the variable-length coded data can be reduced by removing specific components of the variable-length coded data, which components have less influence on the quality of the reproduced image, without performing digital to analog conversion which causes an increase in circuit scale, whereby the circuit scale is further reduced as compared with the apparatus of the fourth aspect.

According to a fifth aspect of the present invention, in the video signal processing apparatus of the second aspect, the specific component removing means comprises coding characteristic detecting means for detecting the characteristics of variable-length codes composing the variable-length coded data, from the variable-length coded data; and specific code removing means for removing specific codes included in the variable-length coded data, in accordance with the characteristics of the variable-length codes detected by the coding characteristic detecting means. Therefore, the data quantity of the variable-length coded data can be reduced by removing specific components of the variable-length coded data, which components have less influence on the quality of the reproduced image, without performing digital to analog conversion which causes an increase in circuit scale, whereby the circuit scale is further reduced as compared with the apparatus of the fourth aspect.

According to a sixth aspect of the present invention, in the image signal processing apparatus of the fifth aspect, the specific component removing means removes the specific variable-length codes by performing the following processes: code length reading process for reading the code lengths of the variable-length codes composing the variable-length coded data; sum total calculating process for accumulatively summing the code lengths read in the code length reading process to obtain the sum total of the code lengths; and variable-length code outputting process for comparing the sum total of the code lengths obtained in the sum total calculating process with a predetermined threshold, and outputting variable-length codes of a code length lower than the threshold, in accordance with the result of the comparison. Since the data quantity of the variable-length coded data is reduced so that its code length does not exceed a predetermined code length, the apparatus performs appropriately when it is desired that the data quantity should be within a set value.

According to a seventh aspect of the present invention, in the video signal processing apparatus of the fifth aspect, the specific component removing means removes the specific variable-length codes by performing the following processes: number obtaining process for obtaining the number of unit data included in variable-length codes composing the variable-length coded data; sum total calculating process for accumulatively summing the numbers of unit data obtained in the number obtaining process, to obtain the sum total of unit data; and variable-length code outputting process for comparing the sum total of the numbers of unit data obtained in the number obtaining process with a predetermined threshold, and outputting variable-length codes having the number of unit data lower than the threshold, in accordance with the result of the comparison. Since the data quantity of the variable-length coded data is reduced so that it has unit data (DCT coefficients) within a predetermined number, this apparatus performs appropriately when a reproduced image with less distortion is desired.

According to an eighth aspect of the present invention, in the video signal processing apparatus of the second aspect, the specific component removing means comprises: digital video signal generating means for generating a digital video signal from the variable-length coded data; specific digital signal removing means for removing a specific part of the digital video signal, from the digital video signal generated by the digital video signal generating means; variable-length coded data generating means for generating variable-length coded data from the processing result of the specific digital signal removing means; and quantization matrix holding means for holding a quantization matrix used for both of the process in the digital video signal generating means and the process in the variable-length coded data generating means. Therefore, the data quantity of the variable-length coded data can be reduced by removing specific components of the variable-length coded data, which components have less influence on the quality of the reproduced image, without performing digital to analog conversion which causes an increase in circuit scale, whereby more flexible setting is achieved as compared with the apparatus of the first aspect.

According to a ninth aspect of the present invention, in the video signal processing apparatus of the first aspect, the coded data to be processed is obtained by intra-frame coding and inter-frame coding, and the specific component removing means removes, as the specific components, high-band components included in the intra-frame coded data amongst the coded data to be processed. Therefore, the data quantity of the intra-frame coded data can be reduced by removing components of the data, which components have less influence on the quality of the reproduced image.

According to a tenth aspect of the present invention, the video signal processing apparatus of the ninth aspect further includes intra-frame coded part extracting means for extracting intra-frame coded data from the coded data to be processed; data holding means for temporarily holding the data; reading indication signal generating means for generating a signal which indicates a timing to read the data held in the data holding means; and data reading control means for controlling reading of data held in the data holding means, in accordance with the signal generated by the reading indication signal generating means. Therefore, the data quantity is reduced and, moreover, it is possible to generate data which can be appropriately recorded in a record medium outside the apparatus in accordance with the readout timing.

According to an eleventh aspect of the present invention, in the video signal processing apparatus of the tenth aspect, the specific component removing means removes the specific components from the processing result of the intra-frame coded part extracting means, and the data holding means holds the processing result of the specific component removing means. Therefore, the above-described effects are obtained.

According to a twelfth aspect of the present invention, in the video signal processing apparatus of the eleventh aspect, the specific component removing means comprises first specific component removing means for removing the specific components from the processing result of the intra-frame coded part extracting means, in accordance with a first characteristic value, and second specific component removing means for removing the specific components from the processing result of the intra-frame coded part extracting means, in accordance with a second characteristic value; the data holding means comprises first data holding means for holding the processing result of the first specific component removing means, and second data holding means for holding the processing result of the second specific component removing means; and the data reading control means comprises first data reading control means for controlling reading of data from the first data holding means, and second data reading control means for controlling reading of data from the second data holding means. Therefore, it is possible to generate two kinds of data having different degrees of data reduction.

According to a thirteenth aspect of the present invention, in the video signal processing apparatus of the tenth aspect, the data holding means holds the processing result of the intra-frame coded part extracting means, and the specific component removing means removes the specific components from the data held by the data holding means. Therefore, the above-described effects are obtained.

According to a fourteenth aspect of the present invention, the video signal processing apparatus of the thirteenth aspect further includes removal characteristic decision means for deciding a characteristic value used for removal of the specific components by the specific component removing means; and the specific component removing means removing the specific components in accordance with the characteristic value decided by the removal characteristic decision means. Therefore, it is possible to generate data having different degrees of data reduction.

DETAILED DESCRIPTION OF THE PREFERRED EMBODIMENTS

[Embodiment 1]

A video signal processing apparatus according to a first embodiment of the present invention performs inverse quantization and quantization by using different quantization matrixes, to reduce the quantity of data.

Figure 1:
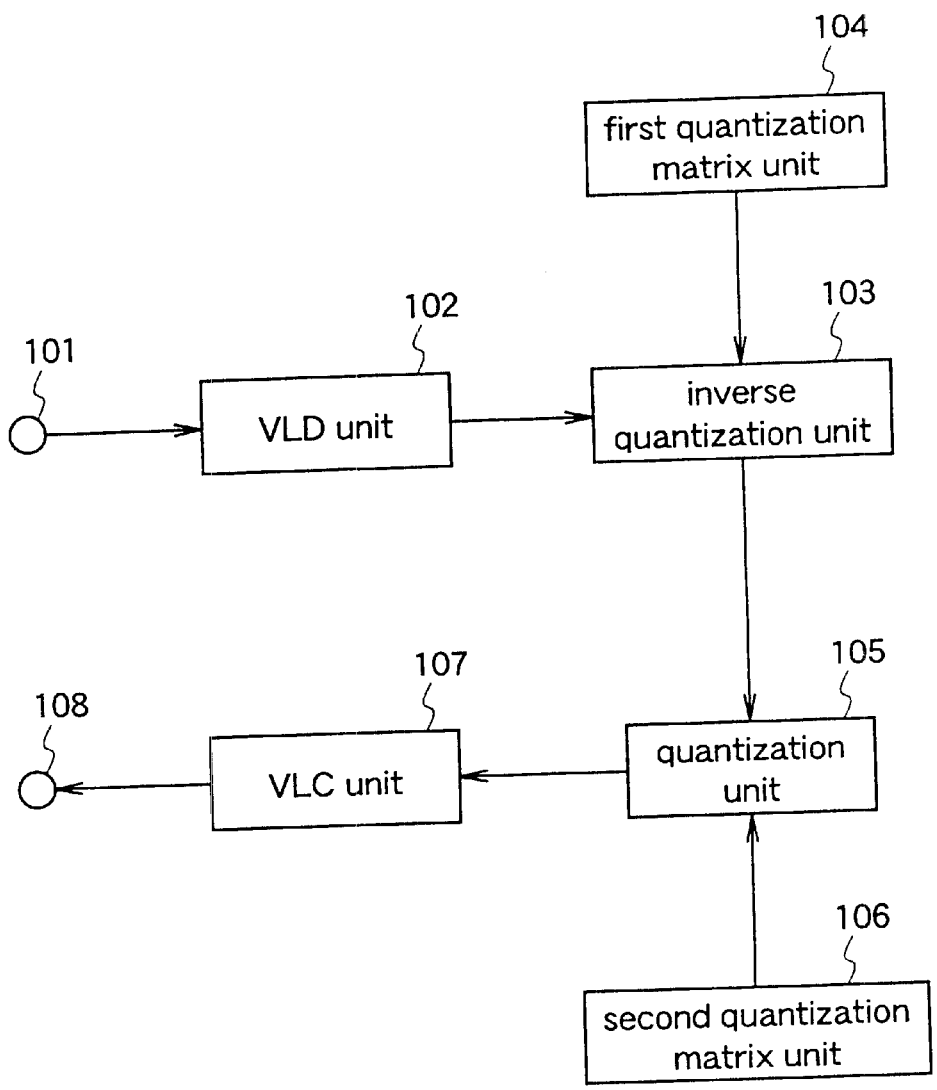
FIG. 1 is a block diagram illustrating a video signal processing apparatus according to a first embodiment of the present invention.

FIG. 1 is a block diagram illustrating the structure of a video signal processing apparatus according to the first embodiment of the present invention. The video signal processing apparatus comprises a VLD (Variable-Length Decoding) unit 102, an inverse quantization unit 103, a first quantization matrix unit 104, a quantization unit 105, a second quantization matrix unit 106, and a VLC (Variable-Length Coding) unit 107. This video signal processing apparatus receives variable-length code word data through an input terminal 101, and outputs processed variable-length code word data through an output terminal 108.

The VLD unit 102 decodes the input variable-length code word data to generate first DCT coefficients. The inverse quantization unit 103 inversely quantizes the first DCT coefficients generated by the VLD unit 102, by using a first quantization matrix obtained from the first quantization matrix unit 104 which is described later, to generate inversely quantized data. The first quantization matrix unit 104 retains the first quantization matrix to be used for the process in the inverse quantization unit 103, and outputs it to the inverse quantization unit 103. The quantization unit 105 quantizes the inversely quantized data generated by the inverse quantization unit 103, by using a second quantization matrix obtained from the second quantization matrix unit 106 which is described later, to generate second DCT coefficients. The second quantization matrix unit 106 retains the second quantization matrix to be used for the process in the quantization unit 105, and outputs it the quantization unit 105. The VLC unit 107 codes the second DCT coefficients generated by the quantization unit 105 to generate variable-length code word data to be output. The variable-length code word data so generated is output from the video signal processing apparatus through the output terminal 108.

A description will be given of the operation of the video signal processing apparatus 50 constructed, when processing variable-length code word data.

As an input to the video signal processing apparatus of this first embodiment, variable-length code word data to be subjected to data reduction is applied to the input terminal 101. In the apparatus, the variable-length code word data is input to the VLD unit 102. The VLD unit 102 subjects the input variable-length code word data to a predetermined decoding process to generate first DCT coefficients. The first DCT coefficients so generated are output from the VLD unit 102 to the inverse quantization unit 103.

In the first quantization matrix unit 104, the first quantization matrix has been retained in advance. On receipt of the first DCT coefficients, the inverse quantization unit 103 obtains the first quantization matrix from the first quantization matrix unit 104. Then, the inverse quantization unit 103 inversely quantizes the first DCT coefficients by using the first quantization matrix to generate inversely quantized data. The inversely quantized data so generated is output from the inverse quantization unit 103 to the guantization unit 105.

In the second guantization matrix unit 106, the second quantization matrix has been retained in advance. On receipt of the inversely quantized data, the quantization unit 105 obtains the second quantization matrix from the second quantization matrix unit 106. Then, the quantization unit 105 quantizes the inversely quantized data by using the second quantization matrix to generate second DCT coefficients.

The first and second quantization matrixes are set so that more high-band AC components have their values of "0" in the second quantization matrix than in the first quantization matrix. Accordingly, more high-band AC components are "0" in the second DCT coefficients generated by the quantization unit 105 than in the first DCT coefficients.

The second DCT coefficients so generated are output from the quantization unit 105 to the VLC unit 107. The VLC unit 107 subjects the second DCT coefficients to a predetermined variable-length coding process to generate variable-length code word data to be output. The variable-length code word data so generated is output through the output terminal 108 to the outside of the video signal processing apparatus.

Since more high-band AC components are "0" in the second DCT coefficients than in the first DCT coefficients, the quantity of the output variable-length code word data is smaller than that of the input variable-length code word data. In the video signal processing apparatus of this first embodiment, the ratio of the high-band AC components whose values are 0 can be decided according to the setting of the second quantization matrix, whereby the degree of reduction of data in the output signal can be controlled.

As described above, according to the first embodiment of the present invention, the video signal processing apparatus comprises the VLD unit 102, the inverse quantization unit 103, the first quantization matrix unit 104, the quantization unit 105, the second quantization matrix unit 106 and the VLC unit 107, and does not perform digital-to-analog conversion, so that the circuit scale of this apparatus is relatively small. Further, the values of high-band AC components of the second DCT coefficients generated by the quantization unit 105 are made 0 by using different quantization matrixes for the inverse quantization and the quantization, whereby the quantity of the variable-length code word data output from the VLC unit 107 can be reduced.

[Embodiment 2]

A video signal processing apparatus according to a second embodiment of the present invention directly processes DCT coefficients to reduce the quantity of data.

Figure 2:
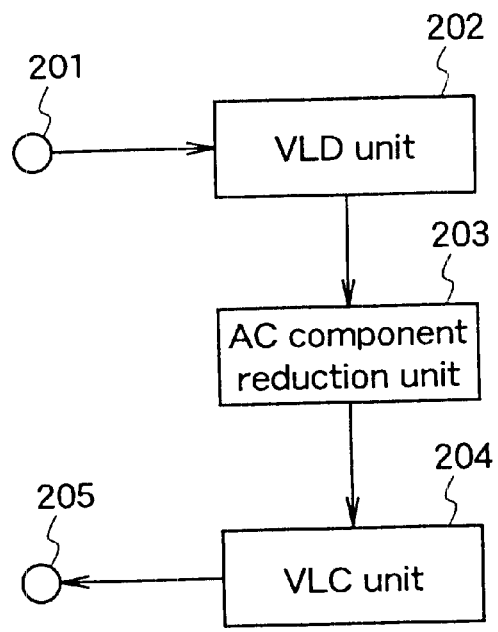
FIG. 2 is a block diagram illustrating a video signal processing apparatus according to a second embodiment of the present invention.

FIG. 2 is a block diagram illustrating the structure of a video signal processing apparatus according to the second embodiment of the invention. As shown in the figure, the video signal processing apparatus comprises a VLD unit 202, an AC component reduction unit 203, and a VLC unit 204. This apparatus receives variable-length code word data through an input terminal 201, and outputs processed variable-length code word data through an output terminal 205.

The VLD unit 202 decodes the input variable-length code word data to generate first DCT coefficients. The AC component reduction unit 203 transforms the first DCT coefficients generated by the VLD unit 202 to generate second DCT coefficients. The VLC unit 204 codes the second DCT coefficients generated by the AC component reduction unit 203 to generate variable-length code word data to be output. The variable-length code word data is output through the output terminal 205 to the outside of the video signal processing apparatus.

A description is given of the operation of the video signal processing apparatus so constructed, when processing variable-length code word data.

As an input to the video signal processing apparatus of this second embodiment, variable-length code word data to be subjected to data reduction is applied to the input terminal 201. In the apparatus, the variable-length code word data is input to the VLD unit 202. The VLD unit 202 subjects the input variable-length code word data to a predetermined decoding process to generate first DCT coefficients. The first DCT coefficients so generated are output from the VLD unit 202 to the AC component reduction unit 203.

In the AC component reduction unit 203, amongst the AC components composing the DCT coefficients to be processed, specific components whose values are to be changed have been determined in advance. By setting the high-band AC components as the components to be changed, the influence of data reduction on the quality of reproduced image can be minimized.

On receipt of the first DCT coefficients output from the VLD unit 202, the AC component reduction unit 203 changes the values of specific AC components of the first DCT coefficients to 0 in accordance with the setting, thereby generating second DCT coefficients. Accordingly, the second DCT coefficients include more high-band AC components whose values are 0 than the first DCT coefficients. The second DCT coefficients so generated are output from the AC component reduction unit 203 to the VLC unit 204.

The VLC unit 204 subjects the input second DCT coefficients to a predetermined variable-length coding process to generate variable-length code word data to be output. The variable-length code word data so generated is output through the output terminal 505 to the outside of the video signal processing apparatus. As in the first embodiment of the invention, since the second DCT coefficients have more high-band AC components whose values are 0 than the first DCT coefficients, the quantity of the output variable-length code word data is smaller than that of the input variable-length code word data. In this second embodiment, since the high-band AC components whose values are to be 0 are decided by setting the AC component reduction unit 203, the degree of data reduction in the signal to be output can be controlled by the AC component reduction unit 203.

As described above, according to the second embodiment of the invention, the video signal processing apparatus comprises the VLD unit 202, the AC component reduction unit 203, and the VLC unit 204, and high-band AC components of the second DCT coefficients are made 0 by subjecting specific AC components to transformation in the AC component reduction unit 203, whereby the quantity of the variable-length code word data output from the VLC unit 204 can be reduced. Therefore, the circuit scale of the apparatus can be further reduced as compared with the apparatus of the first embodiment, although the flexibility of setting is not as high as that of the first embodiment.

[Embodiment 3]

A video signal processing apparatus according to a third embodiment of the present invention analyzes the code length of variable-length code word data and performs transformation according to the result of the analysis, thereby reducing the data quantity.

Figure 3:
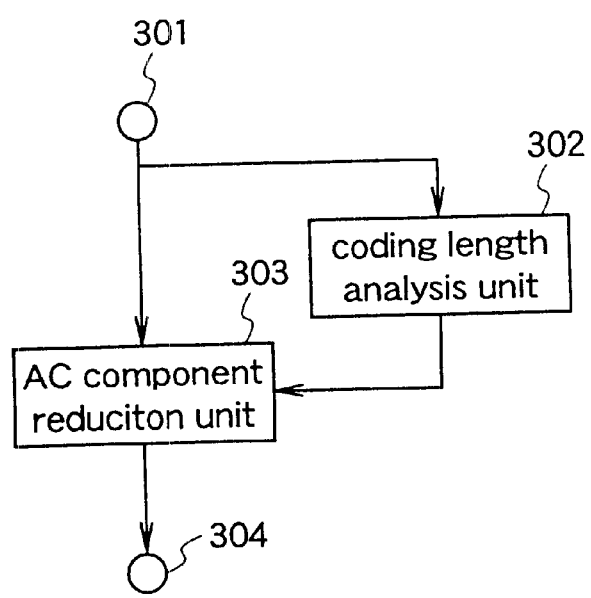
FIG. 3 is a block diagram illustrating a video signal processing apparatus according to a third embodiment of the present invention.

FIG. 3 is a block diagram illustrating the structure of a video signal processing apparatus according to the third embodiment of the invention. The video signal processing apparatus of this third embodiment comprises a code length analysis unit 302 and an AC component reduction unit 303. The video signal processing apparatus receives variable-length code word data through an input terminal 301, and outputs processed variable-length code word data through an output terminal 304.

The code length analysis unit 302 obtains the code length of the input variable-length code word data by calculation. The AC component reduction unit 303 removes a specific part of the variable-length code word data in accordance with the code length obtained by the code length analysis unit 302 to generate variable-length code word data to be output.

A description is given of the operation of the video signal processing apparatus so constructed, when processing the variable-length code word data.

As an input to the video signal processing apparatus, variable-length code word data to be subjected to data reduction is applied to the input terminal 301. In the apparatus, the variable-length code word data is input to the code length analysis unit 302 and the AC component reduction unit 303.

The code length analysis unit 302 obtains the code length of the input variable-length code word data by calculation, and outputs a signal indicating the code length so obtained to the AC component reduction unit 303. The AC component reduction unit 303 detects breaks of variable-length code words in the input variable-length code word data in accordance with the signal from the code length analysis unit 302, inserts a terminal code word (hereinafter, referred to as "EOB") indicating the end of the variable-length code words in a specific position, and removes the part after the specific position, thereby generating variable-length code word data to be output.

Figure 4:
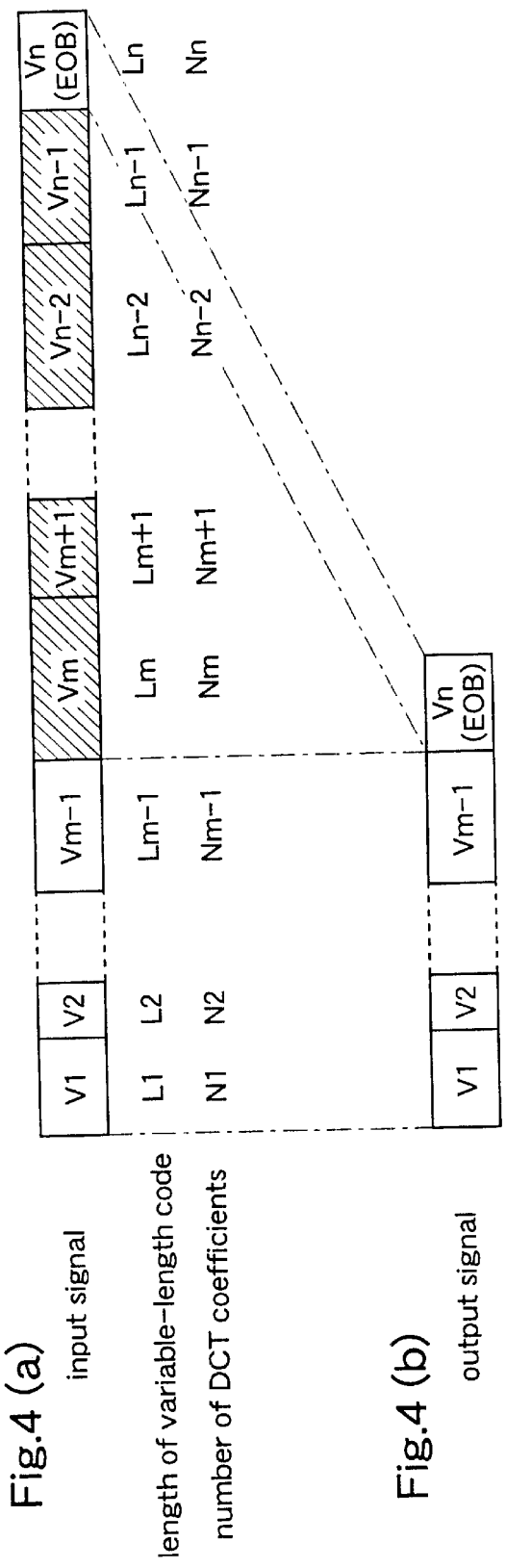
FIGS. 4(a) and 4(b) are diagrams for explaining data reduction in the video signal processing apparatus according to the third embodiment.
Figure 5:
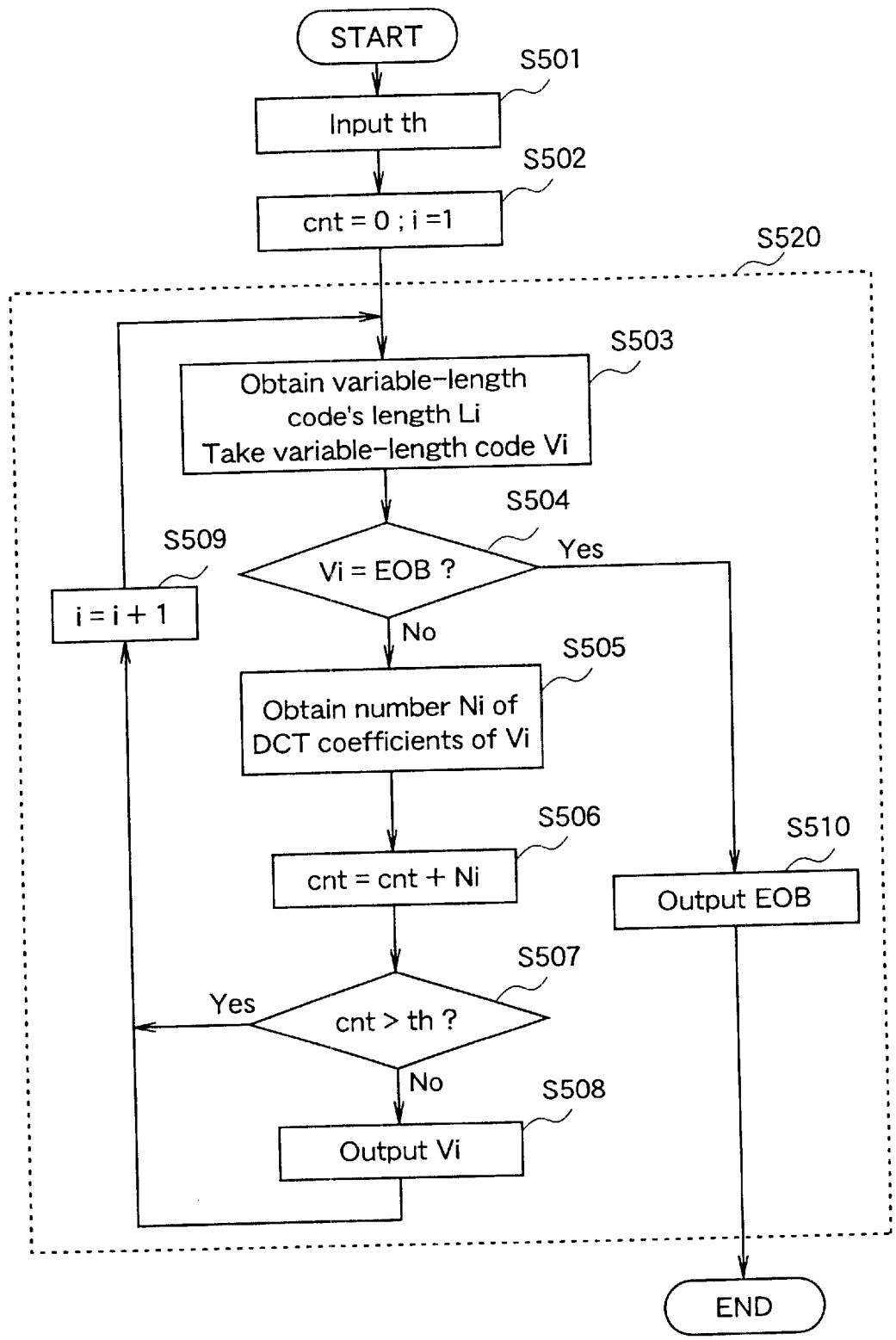
FIG. 5 is a flowchart showing the procedure in the first mode of an AC component reduction unit included in the video signal processing apparatus according to the third embodiment.
Figure 6:
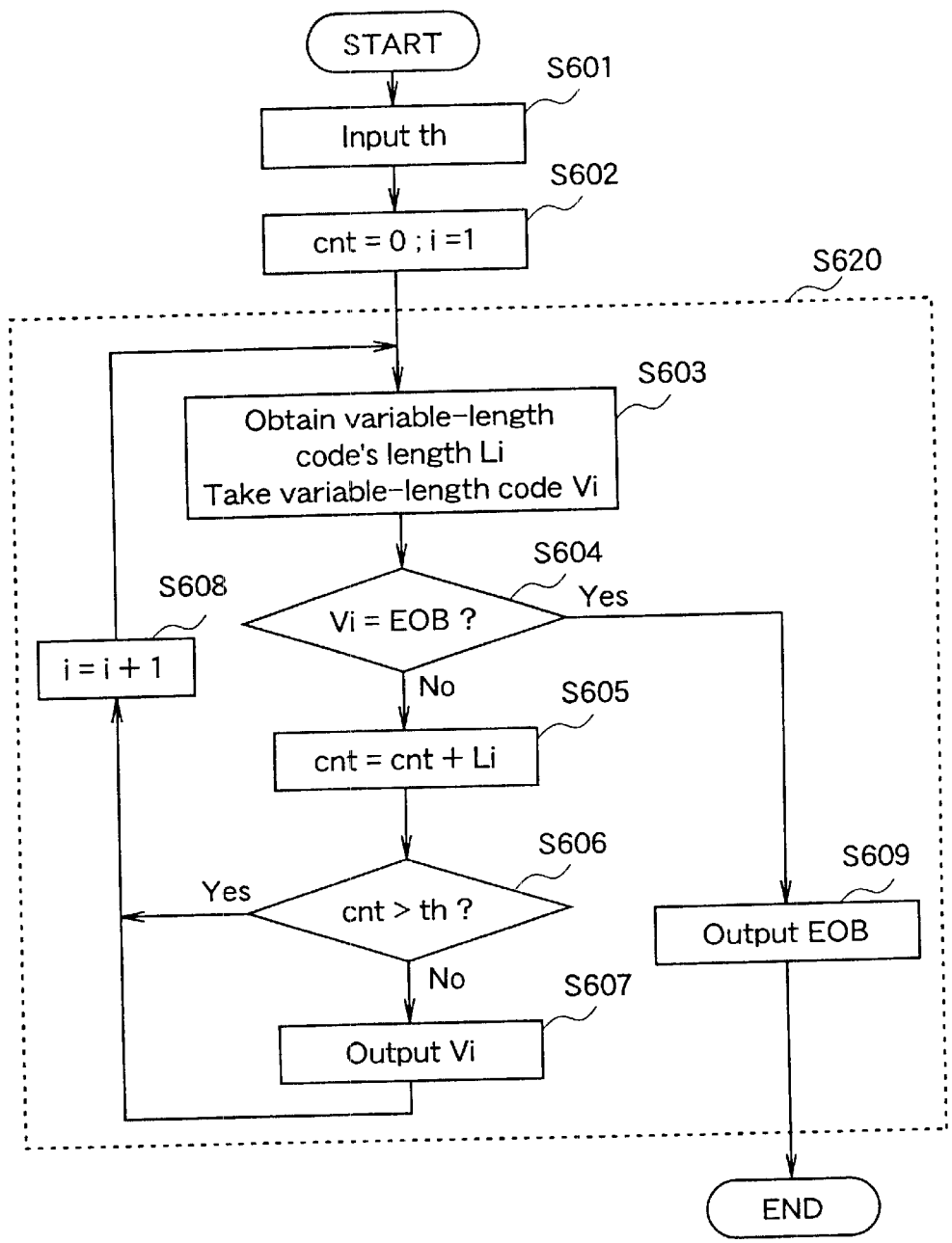
FIG. 6 is a flowchart showing the procedure in the second mode of the AC component reduction unit.
Figure 7:
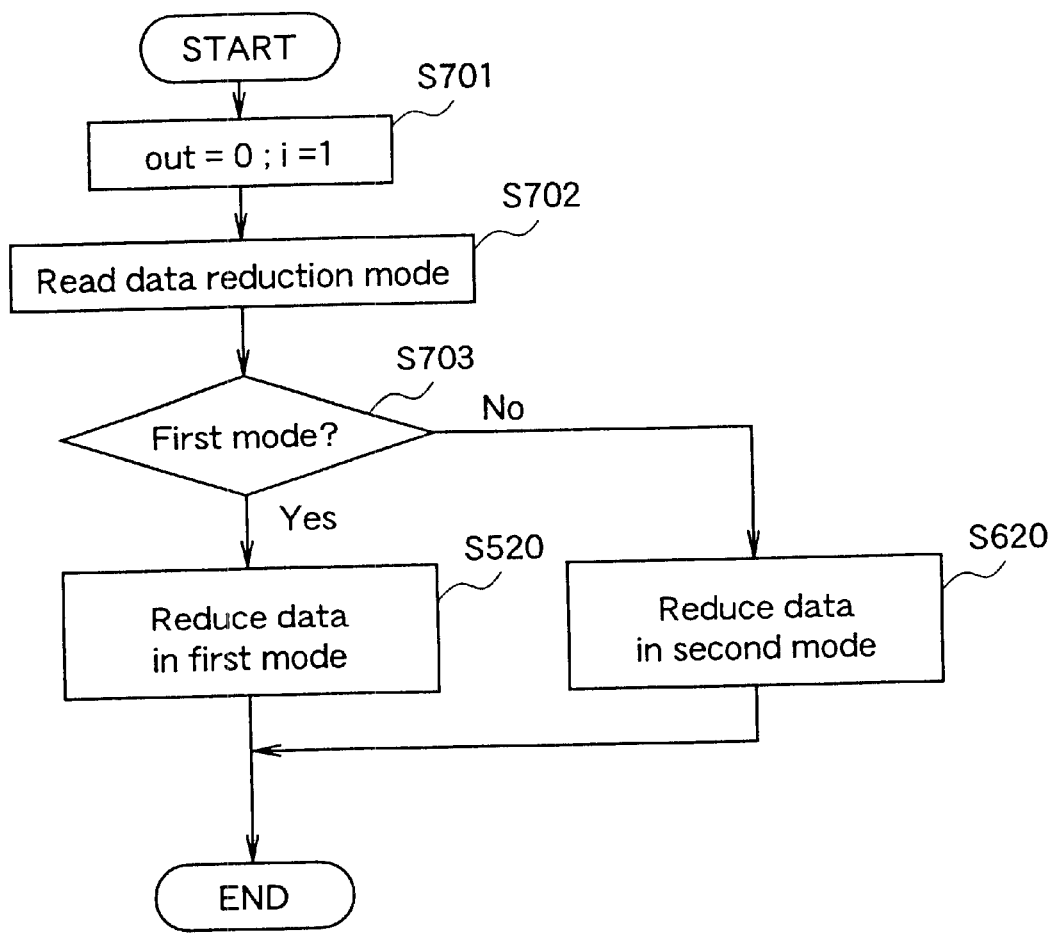
FIG. 7 is a flowchart showing the procedure in the case where the AC component reduction unit switches its mode between the first and second modes.

FIGS. 4(a) and 4(b) are diagrams for explaining, in more detail, the above-mentioned process by the AC component reduction unit 303. FIGS. 5 to 7 are flowcharts for explaining the procedures by the AC component reduction unit 303.

FIGS. 4(a) and 4(b) show the structure of the variable-length code word data input through the input terminal 301 shown in FIG. 3, and the structure of the variable-length code word data output through the output terminal 304, respectively. As shown in FIG. 4(a), in the input variable-length code word data, one DCT block is expressed by a set of variable-length codes $V_1 \sim V_n$, and each of the codes $V_1 \sim V_n$ has the length $L_i$ and the number $N_i$ of DCT coefficients.

In the input variable-length code word data, amongst the code words constituting the data, the code $V_1$ positioned at the head corresponds to the lowest-band data, and the code $V_{n-1}$, positioned just before the code $V_n$ indicating the end corresponds to the highest-band data. The AC component reduction unit 303 executes the processes shown in FIGS. 5 to 7 in accordance with these data to delete the variable-length codes $V_m \sim V_{n-1}$ from the input variable-length code word data shown in FIG. 4(a), thereby generating the output variable-length code word data comprising the variable-length codes $V_1 - V_{m-1}$ shown in FIG. 4(b).

In the video signal processing apparatus of this third embodiment, the AC component reduction unit 303 performs the process in any of the following two modes: DCT coefficient number reduction mode (first mode), and code length reduction mode (second mode). Hereinafter, the procedure of the process by the AC component reduction unit 303 will be described according to the flowcharts of FIGS. 5 to 7.

1. First Mode

In the DCT coefficient number reduction mode as the first mode, the AC component reduction unit 303 reduces the data quantity by restricting the number of the DCT coefficients constituting the data to be output. FIG. 5 is a flowchart showing the procedure of the DCT coefficient number reduction mode.

Initially, in step 501, a threshold th of DCT coefficient number is input, and this value is set as the upper limit of the total number of DCT coefficients allowed in the output variable-length code word data. Accordingly, the variable-length code word data to be output is generated so as to include DCT coefficients as many as or less than the threshold th.

In step 502, a variable i which indicates where a specific variable-length code is positioned from the beginning, and a count cnt accumulating the sum of the numbers of DCT coefficients, are initialized. As shown in FIG. 5, the initial value of the count cnt is 0, and the initial value of the variable i is 1.

Thereafter, the AC component reduction unit 303 executes a first mode reduction process 520 comprising steps 503 to 510.

In step 503, variable-length code word data (FIG. 4(a)) is input, and the i-th variable-length code $V_i$ is read to obtain a variable-length code length $L_i$ of this code. According to the result of the above-mentioned analysis by the code-length analysis unit 302 (see FIG. 3), the AC component reduction unit 303 knows the code length $L_i$.

Next, in step 504, the AC component reduction unit 303 decides whether the variable-length code $V_i$ input in step 503 is "EOB" (a code indicating the end) or not. When the code $V_i$ is "EOB", i.e., when the process has reached the end of the input variable-length code word data to be processed, in step 510, the AC component reduction unit 303 outputs "EOB" indicating the end as a code word (a component) of the output variable-length code word data, whereby the process of the AC component reduction unit 303 is ended.

On the other hand, when it is decided in step 504 that the code $V_i$ is not "EOB", i.e., when the process has not reached the end of the input variable-length code word data to be processed, steps from 505 onwards are executed. Initially, in step 505, the variable-length code $V_i$ is decoded to obtain the number $N_i$ of DCT coefficients in the code $V_i$.

Thereafter, in step 506, the number $N_i$ of DCT coefficients obtained in step 505 is added to the count cnt which is currently held. Next, in step 507, the count Cnt obtained as the result of the addition in step 506 is compared with the threshold th (upper limit) set in step 501 to decide whether the count cnt exceeds the threshold th or not.

When the result in step 507 is that the count cnt is lower than the threshold th, in step 508, the AC component reduction unit 303 outputs the code $V_i$ obtained in step 503, as a code word (a component) of the output variable-length code word data, followed by step 509.

On the other hand, when the decision in step 507 is that the count cnt exceeds the threshold th, the AC component reduction unit 303 bypasses step 508 and goes to step 509. Therefore, the code $V_i$ obtained in step 503 is not output as a code of the output variable-length code word data Whether step 508 is executed or not, the AC component reduction unit 303 returns to step 503 after the variable i specifying the variable-length code is incremented in step 509, so that the next code of the input variable-length code word data is subjected to the above-mentioned process.

As described above, the AC component reduction unit 303 executes the first mode reduction process 520 comprising steps 503~510 for every code as a component of the input variable-length code word data, and when the process has reached the end of the input variable-length code word data, step 510 is executed according to the decision in step 504 to terminate the process.

When the process shown in FIG. 5 is performed on the input variable-length code word data shown in FIG. 4(a), initially, the number of DCT coefficients corresponding to a desired data quantity to be removed is input as the threshold th in step 501. After the initialization in step 502, step 503 is executed to read the code $V_1$ as a code to be processed. Since the code $V_1$ is decided as not "E0B" in step 504, the process proceeds to step 505 wherein the number $N_1$ of DCT coefficients in the code $V_1$ is obtained. In step 506, the number $N_1$ is added to the count cnt whose initial value is 0, and in step 507, the count cnt whose value is $N_1$ is compared with the threshold th.

Since the count cnt is lower than the threshold th, the process proceeds to step 508 wherein the first variable-length code $V_1$ is output as a code (a component) of the output variable-length code word data. Accordingly, as shown in FIG. 4(b), the code $V_1$ is included in the output variable-length code word data. Thereafter, in step 509, the variable i is incremented by one, i.e., from 1 to 2, and the process returns to step 503.

Next, the second code $V_2$ as a component of the input variable-length code word data shown in FIG. 4(a) is processed. It is assumed that the sum of the numbers of DCT coefficients up to the code $V_{m-1}$, i.e., $N_1+N_2+\ldots+N_{m-1}$, is lower than the threshold th (upper limit) set in step 501. In this case, the codes $V_2 \sim V_{m-1}$ are subjected to the processes in steps 503~509 in the same way as mentioned for the code $V_1$. Accordingly, when these codes are processed, step 508 is executed, whereby the codes $V_2 \sim V_{m-1}$ are included in the output variable-length code word data ad shown in FIG. 4(b).

When the variable i has become m by the increment in step 509, step 503 and subsequent steps are performed on the variable-length code $V_m$ shown in FIG. 4(a). steps up to 506 are performed in the same way as mentioned above. Now it is assumed that the sum of the numbers of DCT coefficients up to the code $V_m$, i.e., $N_1+N_2+ \ldots +N_m$, is larger than the threshold th set in step 501. Therefore, according to the decision in step 507, step 508 is bypassed to execute step 509, so that the code $V_m$ is not included in the output variable-length code word data as shown in FIG. 4(b).

The variable-length codes $V_{m+1} \sim V_{n-1}$ are processed in the same way as mentioned above, and these codes are not included in the output variable-length code word data as shown in FIG. 4(b). When the code $V_n$ positioned at the end is read in step 503, since $V_n$ is "EOB", after the decision in step 504, "EOB" is output in step 510, thereby completing the process by the AC component reduction unit 303.

In this way, the AC component reduction unit 303 deletes the variable-length codes $V_m - V_{n-1}$ (higher-band components) from the input variable-length code word data shown in FIG. 4(a) to generate the output variable-length code word data comprising the variable-length codes $V_1 \sim V_{m-1}$ as shown in FIG. 4(b). Accordingly, the data quantity is reduced by the slashed parts shown in FIG. 4(a).

2. Second Mode

In the code length reduction mode as the second mode, the AC component reduction unit 303 reduces the data quantity by restricting the code length of the data to be output. FIG. 6 is a flowchart showing the procedure of the DCT coefficient number reduction mode.

Initially, in step 601, a code length threshold th is input, and this value is set as the upper limit of the code length allowed in the output variable-length code word data. Accordingly, the variable-length code data to be output is generated so as to have a code length shorter than the threshold th.

In step 602, a variable i which indicates where a specific variable-length code is positioned from the beginning, and a count cnt which accumulates the sum of the code lengths, are initialized. As shown in FIG. 6, the initial value of the count cnt is 0, and the initial value of the variable i is 1.

Thereafter, the AC component reduction unit 303 executes a second mode reduction process 620 comprising steps 603 to 609.

In step 603, variable-length code word data (FIG. 4(a)) is input, and the i-th variable-length code $V_i$ is read to obtain a variable-length code length $L_i$ of this code. According to the result of the above-mentioned analysis by the code-length analysis unit 302 (FIG. 3), the AC component reduction unit 303 knows the code length $L_i$.

Next, in step 604, the AC component reduction unit 303 decides whether the variable-length code $V_i$ input in step 603 is "EOB" (a code indicating the end) or not. When the code $V_i$ is "EOB", i.e., when the process has reached the end of the input variable-length code word data to be processed, in step 609, the AC component reduction unit 303 outputs "EOB" indicating the end as a code word (a component) of the output variable-length code word data, whereby the process of the AC component reduction unit 303 is completed.

On the other hand, when it is decided in step 604 that the code $V_i$ is not "EOB", i.e., when the process has not reached the end of the input variable-length code word data to be processed, steps from 605 onwards are executed. Initially, in step 605, the code length $L_i$ obtained in step 603 is added to the count cnt which is currently held. Next, in step 606, the count cnt obtained as the result of the addition in step 605 is compared with the threshold th (upper limit) set in step 601 to decide whether the count cnt exceeds the threshold th or not.

When the result in step 606 is that the count cnt is lower than the threshold th, in step 607, the AC component reduction unit 303 outputs the code $V_i$ obtained in step 603, as a code word (a component) of the output variable-length code word data, followed by step 608.

On the other hand, when the decision in step 606 is that the count cnt exceeds the threshold th, the AC component reduction unit 303 bypasses step 607 and goes to step 608. Therefore, the code $V_i$ obtained in step 603 is not output as a code of the output variable-length code word data.

Whether step 507 is executed or not, the AC component reduction unit 303 returns to step 603 after the variable i specifying the variable-length code is incremented in step 608, so that the next code of the input variable-length code word data is subjected to the above-mentioned process.

As described above, the AC component reduction unit 303 executes the second mode reduction process 620 comprising steps 603~609 for every code as a component of the input variable-length code word data, and when the process has reached the end of the input variable-length code word data, step 609 is executed according to the decision in step 604 to terminate the process.

When the process shown in FIG. 6 is performed on the input variable-length code word data shown in FIG. 4(a), initially, a code length corresponding to a desired data quantity to be deleted is input as the threshold th in step 601. After the initialization in step 602, step 603 is executed to read the code $V_1$ as a code word to be processed. Since the code $V_1$ is decided as not "EOB" in step 604, the process proceeds to step 605 wherein the code length $L_1$ is added to the count cnt whose initial value is 0, and in step 606, the count cnt whose value is $L_1$ is compared with the threshold th.

Since the count cnt is lower than the threshold th, the process proceeds to step 607 wherein the first variable-length code $V_1$ is output as a code (a component) of the output variable-length code word data. Accordingly, as shown in FIG. 4(b), the code $V_1$ is included in the output variable-length code word data. Thereafter, in step 608, the variable i is incremented by one, i.e., from 1 to 2, and the process returns to step 603.

Next, the second code $V_2$ as a component of the input variable-length code word data shown in FIG. 4(a) is processed. It is assumed that the sum of the code lengths up to the code $V_{m-1}$, i.e., $L_1+L_2+ \ldots +L_{m-1}$, is lower than the threshold th (upper limit) set in step 601. In this case, the codes $V_2 \sim V_{m-1}$ are subjected to the processes in steps 603–608 in the same way as mentioned for the code $V_1$. Accordingly, when these codes are processed, step 607 is executed, whereby the codes $V_2 \sim V_{m-1}$ are included in the output variable-length code word data as shown in FIG. 4(b).

When the variable i has become m by the increment in step 608, step 603 and subsequent steps are performed on the variable-length code $V_m$ shown in FIG. 4(a). Steps up to 605 are performed in the same way as mentioned above. Now it is assumed that the sum of the code lengths up to the code $V_m$, i.e., $L_1+L_2+ \ldots +L_m$, is larger than the threshold th set in step 601. Therefore, according to the decision in step 606, step 607 is bypassed to execute step 608, so that the code $V_m$ is not included in the output variable-length code word data as shown in FIG. 4(b).

The variable-length codes $V_{m+1} \sim V_{n-1}$ are processed in the same way as mentioned above, and these codes are not included in the output variable-length code word data as shown in FIG. 4(b). When the code $V_n$ positioned at the end is read in step 603, since $V_n$ is "EOB", after the decision in step 604, "EOB" is output in step 609, thereby completing the process by the AC component reduction unit 303.

In this way, the AC component reduction unit 303 deletes the variable-length codes $V_m$–$V_{n-1}$ (higher-band components) from the input variable-length code word data shown in FIG. 4(a) to generate the output variable-length code word data comprising the variable-length codes $V_1$~$V_{m-1}$ shown in FIG. 4(b). Accordingly, the data quantity is reduced by the slashed parts shown in FIG. 4(a).

As described above, the AC component reduction unit 303 according to this third embodiment removes the high-band components of the variable-length code word data, in either the first mode or the second mode. The first mode, which controls the degree of data compression by the number of DCT coefficients, is effective when distortion of image of the output video signal should be reduced. On the other hand, since the second mode controls the degree of data compression by the accumulated code length, the data quantity of the output video signal can be made uniform and, therefore, this second mode is effective when the data quantity after the data reduction is predetermined.

In this third embodiment, the mode of the AC component reduction unit 303 may be fixed according to the use of the output data. Or, the mode may be switched between the first mode and the second mode as follows.

FIG. 7 is a flowchart for explaining the procedure when the mode of the AC component reduction unit 303 is switched according to the reduction mode designated by the user.

Initially, in step 701, initialization is carried out in the same manner as described for step 502 (step 602) of the flow shown in FIG. 5 (FIG. 6). In the initialization, the count cnt is set at 0, and this count is used to indicate either the sum of the numbers of DCT coefficient numbers or the sum of the code lengths, according to the reduction mode designated in the next step. In step 702, the reduction mode is designated, and a threshold th indicating either the upper limit of the number of DCT coefficients or the upper limit of the code length is set according to the designated reduction mode.

In step 703, it is decided whether the reduction mode designated in step 702 is the first mode or not. When it is the first mode, step 520 follows, and when it is not the first mode, step 620 follows. Step 520 is identical to the first mode reduction process 520 shown in the flow of FIG. 5, and step 620 is identical to the second mode reduction process shown in the flow of FIG. 6. Accordingly, also in this procedure, the data quantity is reduced according to the first mode or the second mode.

As described above, the video signal processing apparatus of this third embodiment is provided with the code length analysis unit 302 and the AC component reduction unit 303, and the upper limit of the number of DCT coefficients or the upper limit of the code length is set in advance. According to the upper limit, the AC component reduction unit 303 removes specific AC components, whereby the data quantity of the variable-length code word data to be output can be reduced. In addition, the circuit scale of this apparatus is further reduced as compared with the apparatus of the second embodiment.

[Embodiment 4]

A video signal processing apparatus according to a fourth embodiment of the present invention reduces the data quantity of an input digital video signal by filtering the digital video signal.

Figure 8:
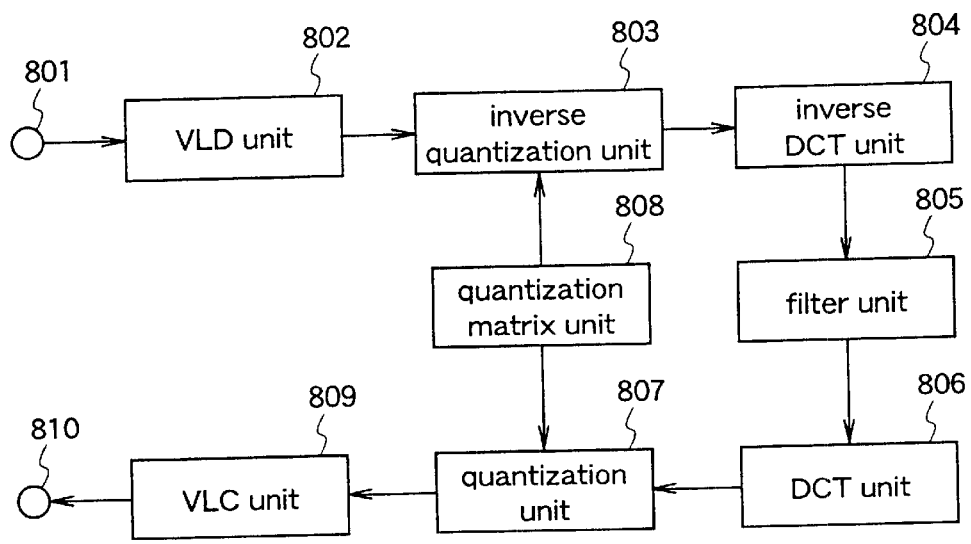
FIG. 8 is a block diagram illustrating a video signal processing apparatus according to a fourth embodiment of the present invention.

FIG. 8 is a block diagram illustrating the structure of a video signal processing apparatus according to the fourth embodiment of the invention. As shown in FIG. 8, the video signal processing apparatus comprises a VLD unit 802, an inverse quantization unit 803, an inverse DCT unit 804, a filter 805, a DCT unit 806, a quantization unit 807, a quantization matrix unit 808, and a VLC unit 809. This apparatus receives variable-length code word data through an input terminal 801, and outputs processed variable-length code word data through an output terminal 810.

The VLD unit 802 decodes the variable-length code word data input through the input terminal 801 to generated first DCT coefficients. The inverse quantization unit 803 inversely quantizes the first DCT coefficients generated by the VLD unit 802, by using a quantization matrix obtained from the quantization matrix unit 908 described later, to generate inverse quantized data.

The inverse DCT unit 804 performs inverse DCT on the inversely quantized data generated by the inverse quantization unit 803 to generate a digital video signal. The filter 805 removes high-band components from the digital video signal generated by the inverse DCT unit 804 to generate a filtered digital video signal. The DCT unit 806 performs DCT on the filtered digital video signal generated by the filter 805 to generate DCT coefficients before quantization. The quantization unit 807 quantizes the DCT coefficients generated by the DCT unit 806 to generate second DCT coefficients.

The quantization matrix unit 808 retains a quantization matrix used for both the inverse quantization by the inverse quantization unit 803 and the quantization by the quantization unit 807, and outputs this to the inverse quantization unit 803 and the quantization unit 807. In the video signal processing apparatus of the first embodiment, the inverse quantization unit 103 (FIG. 1) and the quantization unit 105 use the first and second quantization matrixes obtained from the first and second quantization matrix units 104 and 106, respectively. In this fourth embodiment, however, the inverse quantization unit 803 and the quantization unit 807 use the same quantization matrix obtained from the common quantization matrix unit 808.

The VLC unit 809 encodes the second DCT coefficients generated by the quantization unit 807 to generate variable-length code word data to be output. The variable-length code word data so generated is output from the output terminal 810, as the output of the video signal processing apparatus.

A description is now given of the operation of the video signal processing apparatus of this fourth embodiment when processing input variable-length code word data.

Variable-length code word data to be subjected to data reduction is input to the video signal processing apparatus through the input terminal 801. In the apparatus, the data is input to the VLD unit 802. The VLD unit 802 performs a predetermined decoding process on the input variable-length code word data to generate first DCT coefficients. The first DCT coefficients so generated are output from the VLD unit 802 to the inverse quantization unit 803.

In the quantization matrix unit 808 retains a quantization matrix in advance of the processing by the video signal processing apparatus. On receipt of the first DCT coefficients, the inverse quantization unit 803 obtains the quantization matrix from the quantization matrix unit 808. The inverse quantization unit 803 inversely quantizes the first DCT coefficients by using the quantization matrix to generate inversely quantized data. The inversely quantized data so generated is output from the inverse quantization unit 803 to the inverse DCT unit 804.

The inverse DCT unit 804 performs inverse DCT on the inversely quantized data to generate a digital video signal.

The digital video signal is composed of a luminance signal and a chrominance signal. The digital video signal is output from the inverse DCT unit 804 to the filter 805. The filter 805 filters the digital video signal to remove the high-frequency components, thereby generating filtered digital video signal. The filtered digital video signal is output from the filter 805 to the DCT unit 805.

The DCT unit 805 performs DCT on the filtered digital video signal to generate pre-quantization DCT coefficients. Accordingly, in the pre-quantization DCT coefficients, the values of the AC components corresponding to the high-frequency components removed by the filter 805 have become 0. The pre-quantization DCT coefficients so generated are output from the DCT unit 805 to the quantization unit 807.

On receipt of the pre-quantization DCT coefficients, the quantization unit, the quantization unit 807 obtains the quantization matrix from the quantization matrix unit 808. The quantization unit 807 quantizes the pre-quantization DCT coefficients by using the quantization matrix to generate second DCT coefficients.

As described above, the quantization unit 807 shares the quantization matrix with the inverse quantization unit 803 and, in this point, this fourth embodiment is different from the first embodiment in which more high-band AC components are set at 0 in the second quantization matrix used for quantization than in the first quantization matrix used for inverse quantization. However, in the pre-quantization DCT coefficients before being input to the quantization unit 807, because of the removal of high-band components by the filter 805 in the previous stage, many high-band AC components have become 0. So, more high-band AC components are 0 in the second DCT coefficients generated by the quantization unit 807 than in the first DCT coefficients.

The second DCT coefficients so generated are output from the quantization unit 807 to the VLC unit 809. The VLC unit 809 performs a predetermined variable-length coding process on the second DCT coefficients to generate variable-length code word data to be output. The variable-length code word data so generated is output from the output terminal 810, as the output of the video signal processing apparatus.

As described above, since more high-band AC components are 0 in the second DCT coefficients than in the first DCT coefficients, the quantity of the output variable-length code word data is smaller than that of the input variable-length code word data. In the video signal processing apparatus of this fourth embodiment, since the ratio of high-band AC components whose values should be 0 is determined by setting the filter process of the filter 805, whereby the degree of data reduction in the signal to be output can be controlled.

Since the influence of the filter process can be easily checked by using the digital video signal comprising the luminance signal and the chrominance signal at the input and output sides of the filter 805, the apparatus of this fourth embodiment can set the data quantity to be reduced more flexibly and easily as compared with the apparatus of the first embodiment, although the circuit scale becomes larger than that of the first embodiment.

As described above, according to the fourth embodiment of the present invention, the video signal processing apparatus comprises the VLD unit 802, the inverse quantization unit 803, the inverse DCT unit 804, the filter 805, the DCT unit 806, the quantization unit 807, the quantization matrix unit 808 and the VLC unit 810, and high-frequency components of a digital video signal are removed by filtering the signal, whereby the quantity of variable-length code word data output from the VLC unit can be reduced. Since the removal of high-band components is performed on the digital video signal, the data quantity to be reduced can be set flexibly, and confirmation of the setting or the like is facilitated.

[Embodiment 5]

A video signal processing apparatus according to a fifth embodiment of the invention receives a bit stream signal, and reduces the quantity of data of the bit stream signal to generate two kinds of data for rapid play.

Figure 9:
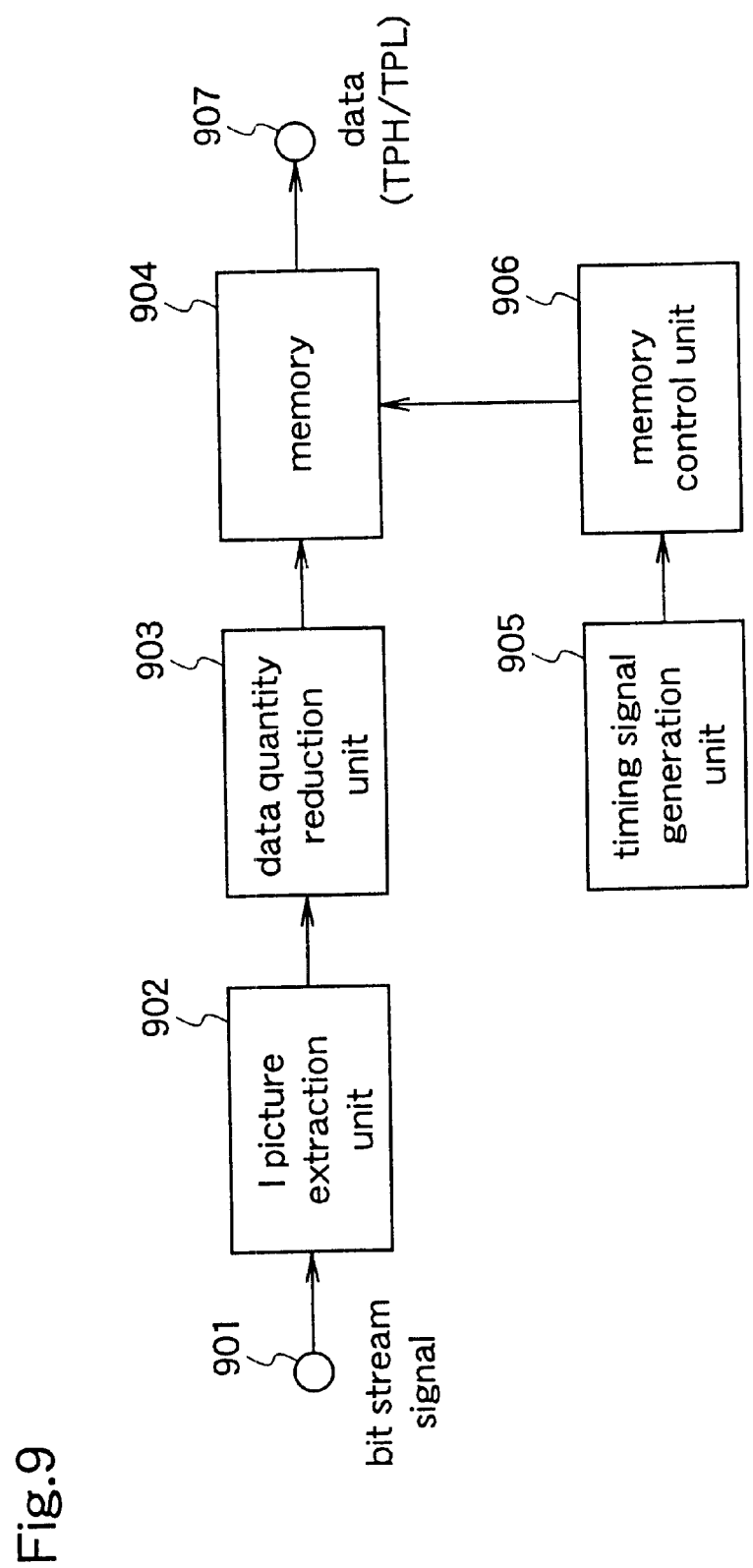
FIG. 9 is a block diagram illustrating a video signal processing apparatus according to a fifth embodiment of the present invention.

FIG. 9 is a block diagram illustrating the structure of a video signal processing apparatus of this fifth embodiment. As shown in the figure, the video signal processing apparatus comprises an I picture extraction unit 902, a data quantity reduction unit 903, a memory 904, a timing signal generation unit 905, and a memory control unit 906. The video signal processing apparatus receives a bit stream signal through an input terminal 901, and outputs two kinds of data for rapid play, TPH data and TPL data, through an output terminal 907.

The I picture extraction unit 902 extracts I picture data from the bit stream signal to be processed. The data quantity reduction unit 903 removes high-band components from the I picture data extracted by the I picture extraction unit 902 to reduce the data quantity, thereby generating quantity-reduced data. The memory 904 retains the data generated by the data quantity reduction unit 903. The timing signal generation unit 905 generates a timing signal to specify the timing at which the data retained in the memory 904 is to be read. The memory control unit 906 controls input/output of data to/from the memory 904 in accordance with the timing signal generated by the timing signal generation unit 905.

Figure 10:
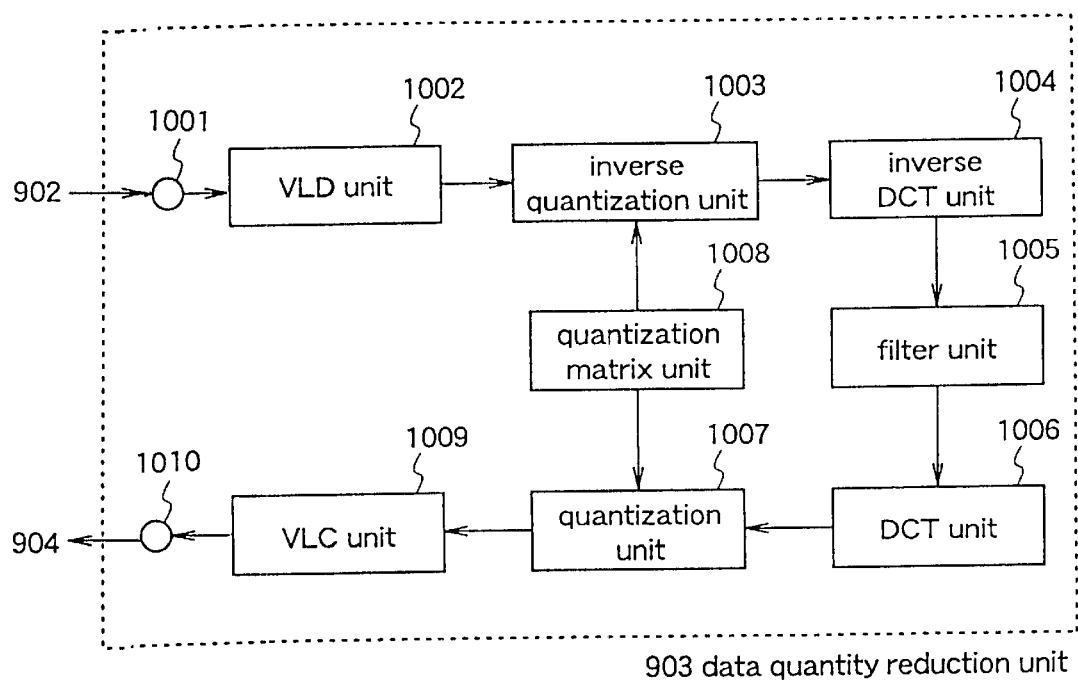
FIG. 10 is a block diagram illustrating the internal structure of a data quantity reduction unit included in the video signal processing apparatus according to the fifth embodiment.

FIG. 10 is a block diagram illustrating the internal structure of the data quantity reduction unit 903. As shown in the figure, the data quantity reduction unit 903 comprises a VLD unit 1002, an inverse quantization unit 1003, an inverse DCT unit 1004, a filter 1005, a DCT unit 1006, a quantization unit 1007, a quantization matrix unit 1008, and a VLC unit 1009. The data quantity reduction unit 903 receives the I picture data extracted by the I picture extraction unit 902, at an input terminal 1001, and outputs processed data from an output terminal 1010.

The internal structure of the data quantity reduction unit 903 is identical to the video signal processing apparatus of the fourth embodiment. That is, the VLD unit 1002, the inverse quantization unit 1003, the inverse DCT unit 1004, the filter 1005, the DCT unit 1006, the quantization unit 1007, the quantization matrix unit 1008, and the VLC unit 1009 are identical to those (802–809) already described for the apparatus of the fourth embodiment and, therefore, do not require repeated description.

A description is given of the operation of the video signal processing apparatus so constructed, when processing a bit stream signal.

Initially, a bit stream signal is input to the input terminal 901 of the video signal processing apparatus. In the apparatus, the bit stream signal is input to the I picture extraction unit 902. The input bit stream signal is generated by compressive coding including intra-frame coding and inter-frame coding in accordance with the general standard such as MPEG2-TS, and this is variable-length code word data in which I picture data generated by intra-frame coding and P or B picture data generated by inter-frame coding coexist.

The I picture extraction unit 902 specifies I picture data by performing syntax analysis on the input bit stream signal, and extracts the data to be output to the data quantity reduction unit 903. since P and B picture data are unsuitable to be used as data for rapid play as described above, these data are not used in the subsequent process.

In the data quantity reduction unit 903 shown in FIG. 10, the I picture data (variable-length code word data) is input to the VLD unit 1002. The data quantity reduction unit 903 operates in the same manner as the video signal processing apparatus of the fourth embodiment, so that quantity-reduced data (data from which high-band components have been removed) is output from the VLC unit 1009. In FIG. 9, the data generated by the data quantity reduction unit 903 is stored in the memory 904.

The data retained in the memory 904 is read to be output to the outside of the apparatus, for recording or transmission. In this fifth embodiment, it is assumed that the output data is recorded in a tape record medium as data for rapid play. Accordingly, the data is required to be recorded in a predetermined position of the tape record medium as shown in FIG. 14.

In the video signal processing apparatus of this fifth embodiment, the timing signal generation unit 905 generates a timing signal which specifies a readout timing required for recording data in a predetermined position of the recording medium, and outputs the timing signal to the memory control unit 906. The memory control unit 906 control the memory 904 in accordance with the input timing signal so that the data stored in a proper position on the memory 904 is read to be output through the output terminal 907.

Figure 14:
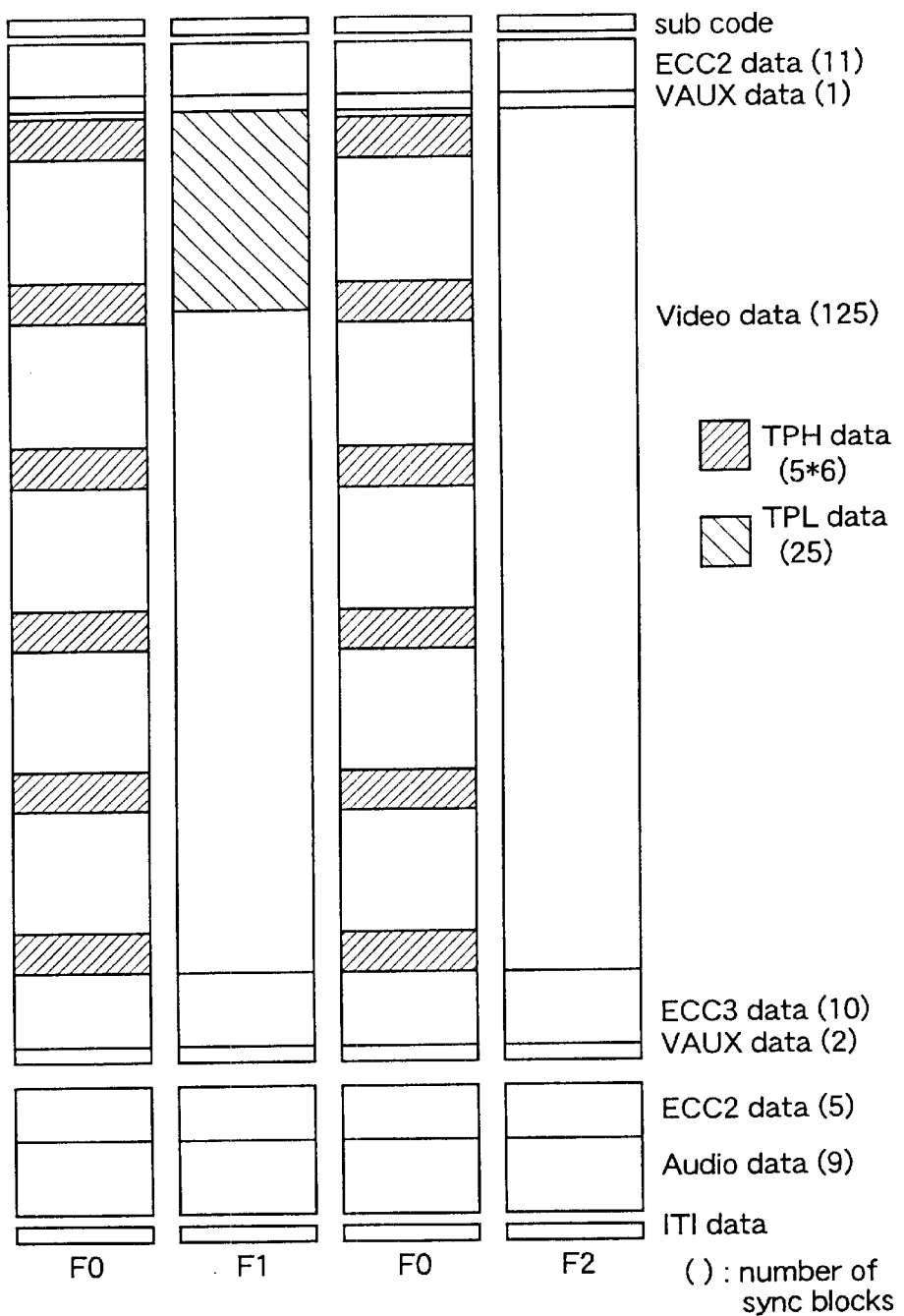
FIG. 14 is a diagram for explaining a recording format of data for trick play on a tape record medium.
Figure 15:
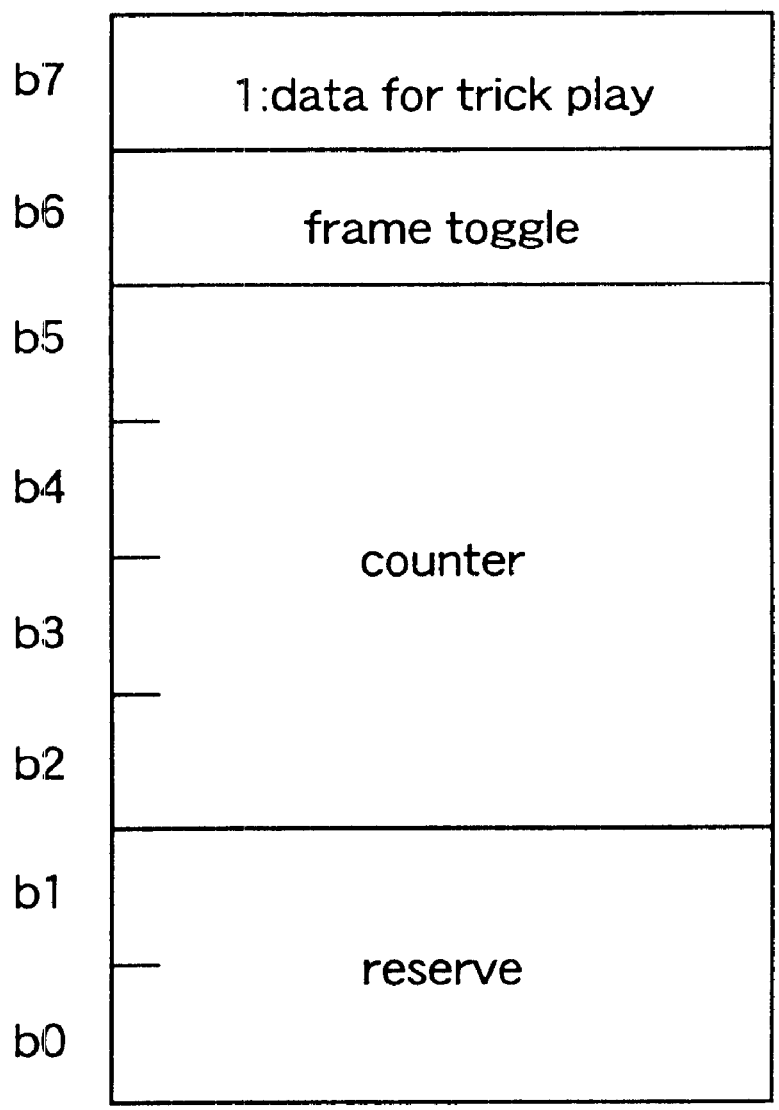
FIG. 15 is a diagram for explaining a header in the recording format shown in FIG. 14.

Since the video signal processing apparatus of this fifth embodiment generates TPH data and TPL data, the timing signal generation unit 905 generates a TPH data read timing signal and a TPL data read timing signal so that data recording is carried out as shown in FIG. 14. Thereby, the data read from the memory 904 under control of the memory control unit 906 and output through the output terminal 907 is recorded in a proper position of the tape record medium, as IPH data or TPL data.

As described above, the video signal processing apparatus according to this fifth embodiment comprises the I picture extraction unit 902, the data quantity reduction unit 903, the memory 904, the timing signal generation unit 905 and the memory control unit 906, and the internal structure of the data quantity reduction unit 903 is identical to the video signal processing apparatus of the fourth embodiment. Therefore, high-band components of the extracted I picture data are removed to reduce the data quantity, and data for rapid play in which motion is not deteriorated is generated while suppressing degradation of image quality.

Since the internal structure of the data quantity reduction unit 903 is identical to the structure of the video signal processing apparatus of the fourth embodiment, flexible setting of data reduction is possible as in the apparatus of the fourth embodiment. However, the internal structure of the data quantity reduction unit 903 is not restricted thereto. The data quantity reduction unit 903 may have the same structure as the video signal processing apparatus according to any of the first to third embodiments and, also in this case, the unit 903 can appropriately output TPH data and TPL data. In this case, the circuit scale can be reduced as compared with that of the fifth embodiment although the flexibility of setting is lowered.

[Embodiment 6]

A video signal processing apparatus according to a sixth embodiment of the present invention generates two kinds of data for rapid play like the fifth embodiment and, moreover, it can set reduction quantities corresponding to the qualities of reproduced images required of the two kinds of data, respectively.

Figure 11:
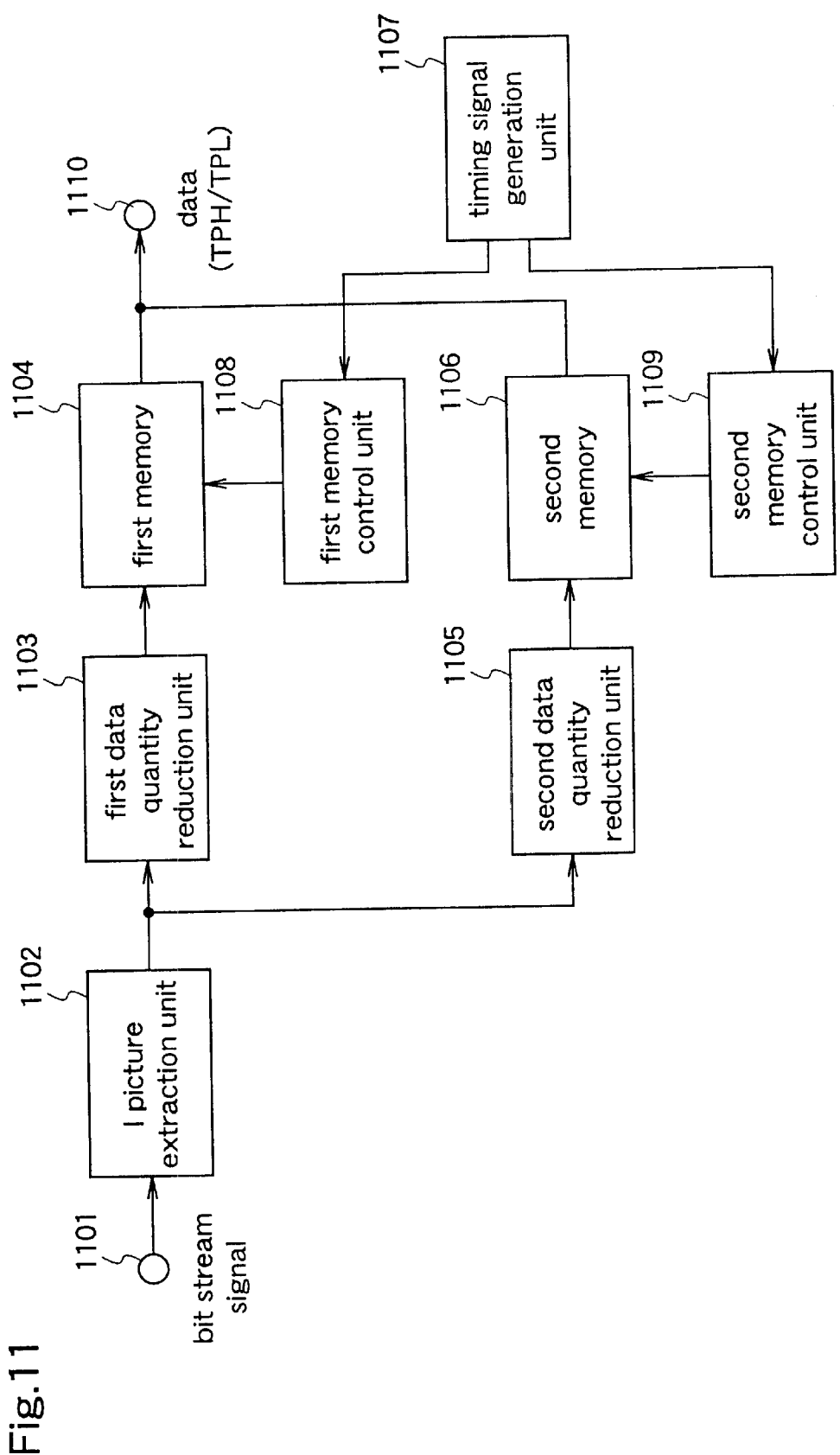
FIG. 11 is a block diagram illustrating a video signal processing apparatus according to a sixth embodiment of the present invention.

FIG. 11 is a block diagram illustrating a video signal processing apparatus according to a sixth embodiment of the present invention. As shown in the figure, the apparatus comprises an I picture extraction-unit 1102, a first data quantity reduction unit 1103, a first memory 1104, a second data quantity reduction unit 1105, a second memory 1106, a timing signal generation unit 1107, a first memory control unit 1108, and a second memory control unit 1109. Like the apparatus of the fifth embodiment, the video signal processing apparatus of this sixth embodiment receives a bit stream signal through an input terminal 1101, and outputs two kinds of data for rapid play, TPH data and TPL data, through an output terminal 1110.

The I picture extraction unit 1102 extracts I picture data from a bit stream signal to be processed. The first and second data quantity reduction units 1103 and 1105 remove high-band components from the I picture data extracted by the I picture extraction unit 1102 to reduce the data quantity, thereby generating quantity-reduced data. Both of the first and second data quantity reduction units 1103 and 1105 have the same structure as the data quantity reduction unit 903 possessed by the apparatus of the fifth embodiment (referred to FIG. 10), but these units have different characteristics with respect to data reduction. In this sixth embodiment, the first and second data quantity reduction units 1103 and 1105 provide different data reduction quantities.

The first and second memories 1104 and 1106 retain the data generated by the first and second data quantity reduction units 1103 and 1105, respectively. The timing signal generation unit 1107 outputs timing signals which specify the timings for reading the data retained in the first and second memories 1104 and 1106. The first and second memory control units 1108 and 1109 control input/output of data to/from the first and second memories 1104 and 1106, in accordance with the timing signals generated by the timing signal generation unit 1107.

The image signal processing apparatus of the fifth embodiment includes one data reduction unit (903), one memory (904), and one memory control unit (905) as shown in FIG. 9, and both of the TPH data and the TPL data (two kinds of data for rapid play) are processed by these units, the same quantity of data is deleted from each data.

Since the TPH data and the TPL data have different maximum search rates, their allowable limits of image deterioration due to data reduction are different from each other. With respect to the image signal processing apparatus of the fifth embodiment, the circuit scale is minimized on the premise that the same quantity of data is reduced from each data. On the other hand, in the image signal processing apparatus of this sixth embodiment, different data reduction units, different memories, and different memory control units are used for the process to the TPH data and the process to the TPL data, respectively, so that different quantities of data can be deleted from these data.

A description is given of the operation of the video signal processing apparatus constructed as described above, when processing a bit stream signal.

As an input to the video signal processing apparatus, a bit stream signal is applied to the input terminal 1101, and the bit stream signal is input to the I picture extraction unit 1102. As in the fifth embodiment of the invention, the input bit stream signal is generated by compressive coding including intra-frame coding and inter-frame coding, in accordance with a general standard such as MPEG2-TS, and this is variable-length code word data in which I picture data generated by intra-frame coding and P or B picture data generated by inter-frame coding coexist.

The I picture extraction unit 1102 specifies I picture data by syntax analysis to the input bit stream signal, and extracts the I picture data to output it to the first data quantity reduction unit 1103 and the second data quantity reduction unit 1105. As in the fifth embodiment, the P and B picture data are not used in the subsequent process.

The first and second data quantity reduction units 1103 and 1105, each having the internal structure shown in FIG. 10, remove high-band components in accordance with the respective settings, to reduce the data quantity, thereby generating first and second processed data from which different quantities of data have been deleted. The first and second processed data are retained in the first and second memories 1104 and 1106, respectively.

The timing signal generation unit 1107 generates first and second timing signals which specify read timings required for reading the processed data retained in the memories, as TPH data and TPL data, and recording these data in predetermined positions of an external recording medium, respectively. The timing signal generation unit 1107 outputs the first timing signal to the first memory control unit 1108, and the second timing signal to the second memory control unit 1109. The memory control units 1108 and 1109 control the first and second memories 1104 and 1106 so that the data stored in appropriate positions of the first and second memories are read in accordance with the input timing signals and output from the output terminal 1110. Thereby, the data output from the output terminal 1110 are recorded in appropriate positions of the tape record medium.

As described above, the image signal processing apparatus of this sixth embodiment comprises the I picture extraction unit 1102, the first data quantity reduction unit 1103, the first memory 1104, the second data quantity reduction unit 1105, the second memory 1106, the timing signal generation unit 1107, the first memory control unit 1108 and the second memory control unit 1108, and the data quantity is reduced by removing high-band components from extracted I picture data as in the apparatus of the fifth embodiment, thereby generating data for rapid play in which motion is not deteriorated while suppressing the degradation of image quality. This apparatus can perform data reduction adaptive to different data for rapid play for which different image qualities are required, although the circuit scale is somewhat increased as compared with that of the fifth embodiment.

In the video signal processing apparatus of this sixth embodiment, the internal structures of the first and second data quantity reduction units 1103 and 1105 are identical to the structure of the video signal processing apparatus of the fourth embodiment, whereby flexible setting is realized. However, the internal structures of the data quantity reduction units 1103 and 1105 may be identical to any of the video signal processing apparatuses according to the first to third embodiments to minimize the circuit scale.

[Embodiment 7]

A video signal processing apparatus according to a seventh embodiment of the invention can set the reduction quantities corresponding to image qualities required of two kinds of data as in the sixth embodiment and, moreover, it can perform the setting at an arbitrary point of time.

Figure 12:
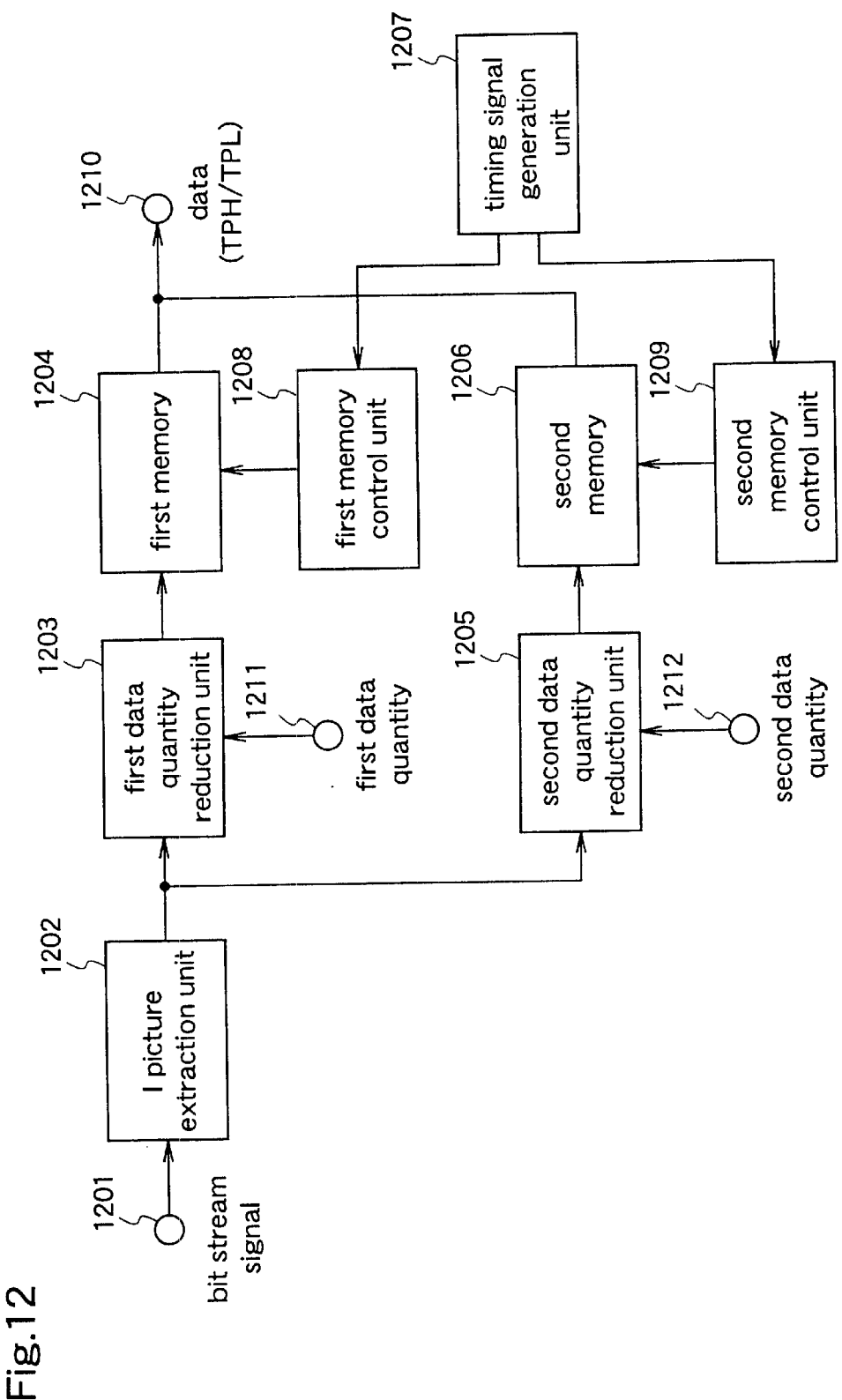
FIG. 12 is a block diagram illustrating a video signal processing apparatus according to a seventh embodiment of the present invention.

FIG. 12 is a block diagram illustrating the structure of a video signal processing apparatus according to the seventh embodiment of the invention. As shown in the figure, the apparatus includes an I picture extraction unit 1202, a first data quantity reduction unit 1203, a first memory 1204, a second data quantity reduction unit 1205, a second memory 1206, a timing signal generation unit 1207, a first memory control unit 1208, and a second memory control unit 1208.

Like the apparatus of the fifth embodiment, the apparatus of this seventh embodiment receives a bit stream signal through an input terminal 1201, and outputs two kinds of data for rapid play, TPH data and TPL data, through an output terminal 1201. The apparatus of this seventh embodiment further includes a first data quantity input terminal 1211 through which a first data quantity is input to the first data quantity reduction unit 1203, and a second data quantity input terminal 1212 through which a second data quantity is input to the second data quantity reduction unit 1205. That is, in the apparatus of this seventh embodiment, the first data quantity input terminal 1211 and the second data quantity input terminal 1212 are added to the constituents of the apparatus of the sixth embodiment.

The first data quantity reduction unit 1203 performs reduction of data quantity in accordance with the first data quantity input through the input terminal 1211, and the second data quantity reduction unit 1205 performs reduction of data quantity in accordance with the second data quantity input through the input terminal 1212. The I picture extraction unit 1202, the first memory 1204, the second memory 1206, the timing signal generation unit 1207, the first memory control unit 1208, and the second memory control unit 1209 are identical to those (1102, 1104, 1106, 1107–1109) possessed by the apparatus of the sixth embodiment.

The operation of the video signal processing apparatus of this seventh embodiment is identical to that of the apparatus of the sixth embodiment except that the first and second data quantities are input to the first and second data quantity reduction units 1203 and 1205, respectively, and the first and second data quantity reduction units 1203 and 1205 decide the quantities of data to be deleted in accordance with the input data quantities. The data quantities input from the outside may specify the quantity of data to be deleted or the quantity of data remaining after the deletion, and the data quantities can be input in advance of the processing or at an arbitrary point of time during the processing.

As described above, according to the image signal processing apparatus of this seventh embodiment, the first data quantity input terminal 1211 and the second data quantity input terminal 1212 are added to the video signal processing apparatus of the sixth embodiment. Since the apparatus performs data reduction processes adapted to different data for rapid play for which different image qualities are desired like the apparatus of the sixth embodiment and, further, the data quantities can be input at an arbitrary point of time, whereby the quantity of data to be deleted is variable, and the image qualities of the respective data for rapid play can be controlled.

Also in this seventh embodiment, like the image signal processing apparatuses of the fifth and sixth embodiments, the data quantity reduction units 1203 and 1205 may have the same structure as the video signal processing apparatus according to any of the first to fourth embodiments.

[Embodiment 8]

A video signal processing apparatus according to an eighth embodiment of the invention can set reduction quantities corresponding to the image qualities required of two kinds of data as in the seventh embodiment of the invention and, moreover, it can perform the setting at an arbitrary point of time.

Figure 13:
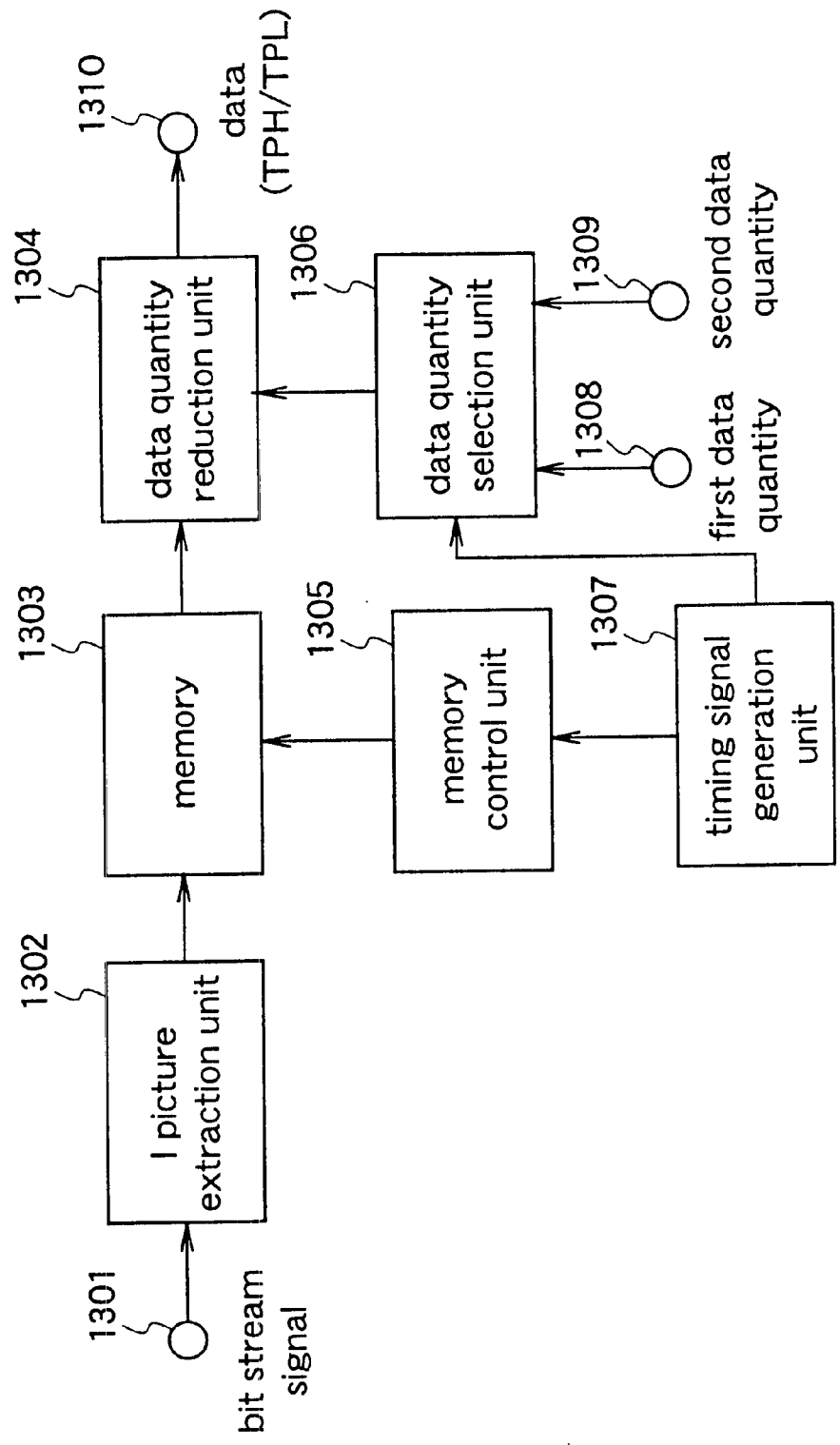
FIG. 13 is a block diagram illustrating a video signal processing apparatus according to an eighth embodiment of the present invention.

FIG. 13 is a block diagram illustrating the structure of a video signal processing apparatus according to the eighth embodiment of the invention. As shown in the figure, the apparatus comprises an I picture extraction unit 1302, a memory 1303, a data quantity reduction unit 1304, a memory control unit 1305, a data quantity selection unit 1306, and a timing signal generation unit 1307. The apparatus receives a bit stream signal through an input terminal 1301 and outputs two-kinds of data for rapid play, TPH data and TPL data, through an output terminal 1310. Further, also in this eighth embodiment, as in the seventh embodiment, the apparatus includes the first and second data quantity input terminals 1308 and 1309 to which first and second data quantities are input from the outside of the apparatus. In this eighth embodiment, however, the first and second data quantities are input to the data quantity selection unit 1306.

The I picture extraction unit 1302 extracts I picture data from the bit stream signal to be processed. The memory 1303 retains the I picture data extracted by the I picture extraction unit 1302. The data quantity reduction unit 1304 removes high-band components from the I picture data which has been read from the memory 1303 under control of the memory control unit 1305, in accordance with the data quantity supplied from the data quantity selection unit 1306, to reduce the data quantity, thereby generating quantity-reduced data. In this eighth embodiment, the quantity-reduced data is output as TPH data or TPL data.

The data quantity selection unit 1306 selects appropriate one from the input first and second data quantities, according to the timing signal supplied from the timing signal generation unit 1307, i.e., according to whether the timing signal indicates the TPH data's timing or the TPL data's timing, and outputs the selected one to the data quantity reduction unit 1304. The memory control unit 1305 controls input/output of data to/from the memory 1303, according to the timing signal generated by the timing signal generation unit 1307. The timing signal generation unit 1307 generates a timing signal which specifies the timing for reading the data retained in the memory 1303. In this eighth embodiment, the timing signal generated by the timing signal generation unit 1307 is input to the memory control unit 1305 to be for control of data reading from the memory 1303 and, further, it is input to the data quantity selection unit 1303 to be used for selection of data quantity.

A description is given of the operation of the video signal processing apparatus so constructed, when processing a bit stream signal.

As an input to the video signal processing apparatus of this eighth embodiment, a bit stream signal is input to the input terminal 1301. In the apparatus, the signal is input to the I picture extraction unit 1302. Also in this eighth embodiment, the input bit stream signal is generated by compressive coding including intra-frame coding and inter-frame coding, according to a general standard such as MPEG2-TS, and it is variable-length code word data wherein I picture data generated by intra-frame coding and P or B picture data generated by inter-frame coding coexist.

The I picture extraction unit 1302 specifies I picture data by syntax analysis on the input bit stream signal, and extracts this to be-output to the memory 1303. Also in this eighth embodiment, the P and B picture data are not used in the subsequent processing. The I picture data is retained in the memory 1303.

The timing signal generation unit 1307 generates a timing signal which specifies a timing for reading data, which is appropriate for output of the TPH data or the TPL data, and outputs the timing signal to the memory control unit 1305 and the data quantity selection unit 1306. The memory control unit 1305 controls the memory 1303 so that appropriate data is read from the memory 1303 in accordance with the timing signal and input to the data quantity reduction unit 1304.

On the other hand, first and second data quantities are input from the outside of the apparatus, through the first and second data quantity input terminals 1308 and 1309, to the data quantity selection unit 1306, On receipt of the timing signal, the data quantity selection unit 1306 selects one of the first and second data quantities, according to whether the timing signal indicates the TPH datas timing or the TPL datas timing, and outputs the selected data quantity to the data quantity reduction unit 1304.

The data quantity reduction unit 1304 removes high-band components from the data supplied from the memory 1303, so as to realize the data reduction quantity decided according to the data quantity supplied from the data quantity selection unit 1306, and outputs the data after the data reduction to the output terminal 1310. Thereby, the data output from the output terminal 1310 is recorded in an appropriate position of a tape record medium, as TPH data or TPL data.

As described above, the video signal processing apparatus according to this eighth embodiment comprises the I picture extraction unit 1302, the memory 1303, the data quantity reduction unit 1304, the memory control unit 1305, the data quantity selection unit 1306 and the timing signal generation unit 1307, and the memory retains not the quantity-reduced data but the I picture data, and the data which has been processed by the data quantity reduction unit 1304 is output. Therefore, like the apparatus of the seventh embodiment, the apparatus of this eighth embodiment performs reduction processes adapted to different data for rapid play for which different image qualities are desired. Further, since the data quantity can be input at an arbitrary period of time, the quantity of data to be removed is variable, and the image qualities of the respective data for rapid play can be controlled. Moreover, the circuit scale is reduced as compared with the apparatus of the seventh embodiment although the control is somewhat complicated.

Also in this eighth embodiment, like the fifth to seventh embodiments of the invention, the data quantity reduction unit 1304 may have the same structure as the video signal processing apparatus according to any of the first to fourth embodiments.

Moreover, the video signal processing apparatus of this eighth embodiment has the first data quantity input terminal 1308 and the second data quantity input terminal 1309, whereby the data quantity can be input to the apparatus at an arbitrary point of time. However, if adjustment of image quality is not required during the processing, these input terminals may be dispensed with, and the data quantity selection unit 1306 may specify the quantity of data to be removed, which is previously set for TPH or TPL data by the data quantity selection unit 1306, whereby the data quantity reduction unit 1304 performs reduction of data quantity in accordance with the setting, as in the apparatus of the sixth embodiment. Also in this case, the circuit scale can be reduced as compared with the apparatus of the sixth embodiment.

What is claimed is:

1. A video signal processing apparatus for processing variable-length coded data, said video signal processing apparatus comprising:
    specific component removing means for removing high-band components included in the variable-length coded data, said specific component removing means comprising:
        coding characteristic detecting means for detecting characteristics of variable-length codes of the variable-length coded data from the variable-length coded data; and specific code removing means for removing specific codes included in the variable-length coded data in accordance with the characteristics of the variable-length coded data detected by said coding characteristic detecting means, wherein said specific component removing means removes the high-band components by reading code lengths of the variable length codes of the variable-length coded data, accumulatively summing the code lengths to obtain a sum total of the code lengths, comparing the sum total of the code lengths with a predetermined threshold, and outputting variable-length codes of a code length lower than the predetermined threshold in accordance with a result of the comparison.

2. A video signal processing apparatus for processing variable-length coded data, said video signal processing apparatus comprising:

specific component removing means for removing high-band components included in the variable-length coded data, said specific component removing means comprising:

coding characteristic detecting means for detecting characteristics of variable-length codes of the variable-length coded data from the variable-length coded data; and specific code removing means for removing specific codes included in the variable-length coded data in accordance with the characteristics of the variable-length coded data detected by said coding characteristic detecting means, wherein said specific component removing means removes the high-band components by obtaining numbers of unit data included in the variable length codes of the variable-length coded data, accumulatively summing the numbers of unit data to obtain a sum total of the numbers of unit data, comparing the sum total of the numbers of unit data with a predetermined threshold, and outputting variable-length codes of a number of unit data lower than the predetermined threshold in accordance with a result of the comparison.

* * * * *